(12) United States Patent
Sharma et al.

(10) Patent No.: US 11,277,328 B1
(45) Date of Patent: Mar. 15, 2022

(54) USING ANYCAST AS AN ABSTRACT NEXT HOP (ANH) TO REDUCE INFORMATION RELATED TO BORDER GATEWAY PROTOCL (BGP) NEXT HOPS RECEIVED BY AUTONOMOUS SYSTEM BORDER ROUTERS (ASBRS) AND/OR TO IMPROVE BGP PATH CONVERGENCE

(71) Applicant: Juniper Networks, Inc., Sunnyvale, CA (US)

(72) Inventors: Suraj Narayan Sharma, Cherry Hill, NJ (US); Hitesh Mali, Cherry Hill, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 44 days.

(21) Appl. No.: 16/995,714

(22) Filed: Aug. 17, 2020

(51) Int. Cl.
*H04L 12/751* (2013.01)
*H04L 45/02* (2022.01)
(Continued)

(52) U.S. Cl.
CPC .............. *H04L 45/02* (2013.01); *H04L 45/04* (2013.01); *H04L 61/2069* (2013.01)

(58) Field of Classification Search
None
See application file for complete search history.

(56) References Cited

U.S. PATENT DOCUMENTS

| | | | |
|---|---|---|---|
| 2011/0116509 A1* | 5/2011 | Moreno | H04L 45/28 370/401 |
| 2015/0288540 A1* | 10/2015 | Kotalwar | H04L 12/1886 370/254 |

FOREIGN PATENT DOCUMENTS

| | | | | |
|---|---|---|---|---|
| WO | WO-2021164892 A1 * | 8/2021 | ........ | H04W 36/0011 |

OTHER PUBLICATIONS

R. Szarecki, Ed., et al, "Use of Abstract NH in Scale-Out Peering Architecture," *draft-szarecki-grow-abstract-nh-scaleout-peering-00* (Internet Engineering Task Force, Feb. 6, 2019.
(Continued)

*Primary Examiner* — Robert M Morlan
(74) *Attorney, Agent, or Firm* — John C. Pokotylo; Pokotylo Patent Services

(57) ABSTRACT

An autonomous system border router (ASBR) provided in a domain in which routers share an anycast address, may perform a method comprising: (a) receiving, from an exterior Border Gateway Protocol (eBGP) peer, first reachability information for a first prefix, the first reachability information including a first next hop (NH) address; (b) communicating first link state information about the first prefix to another router in the domain, the first link state information associating the first prefix with the anycast address; (c) receiving, from an eBGP peer, second reachability information for a second prefix, the second reachability information including a second next hop (NH) address; and (d) communicating second link state information about the second prefix to the other router in the domain, the second link state information associating the second prefix with the anycast address. This effectively reduces the number of next hops related to a prefix learned by two or more ASBRs (e.g., one or more spine routers in a Clos of an aggregate spine) via eBGP, stored as forwarding information on a non-ASBR in an IGP domain (e.g., on a leaf node in a Clos of an aggregate spine).

20 Claims, 18 Drawing Sheets

(51) Int. Cl.
*H04L 61/5069* (2022.01)
*H04L 45/00* (2022.01)

(56) References Cited

OTHER PUBLICATIONS

A. Bashandy, Ed., et al, "BGP Prefix Independent Convergence," *draft-ietf-rtgwg-bgp-pic-11* (Internet Engineering Task Force, Feb. 10, 2020).

\* cited by examiner

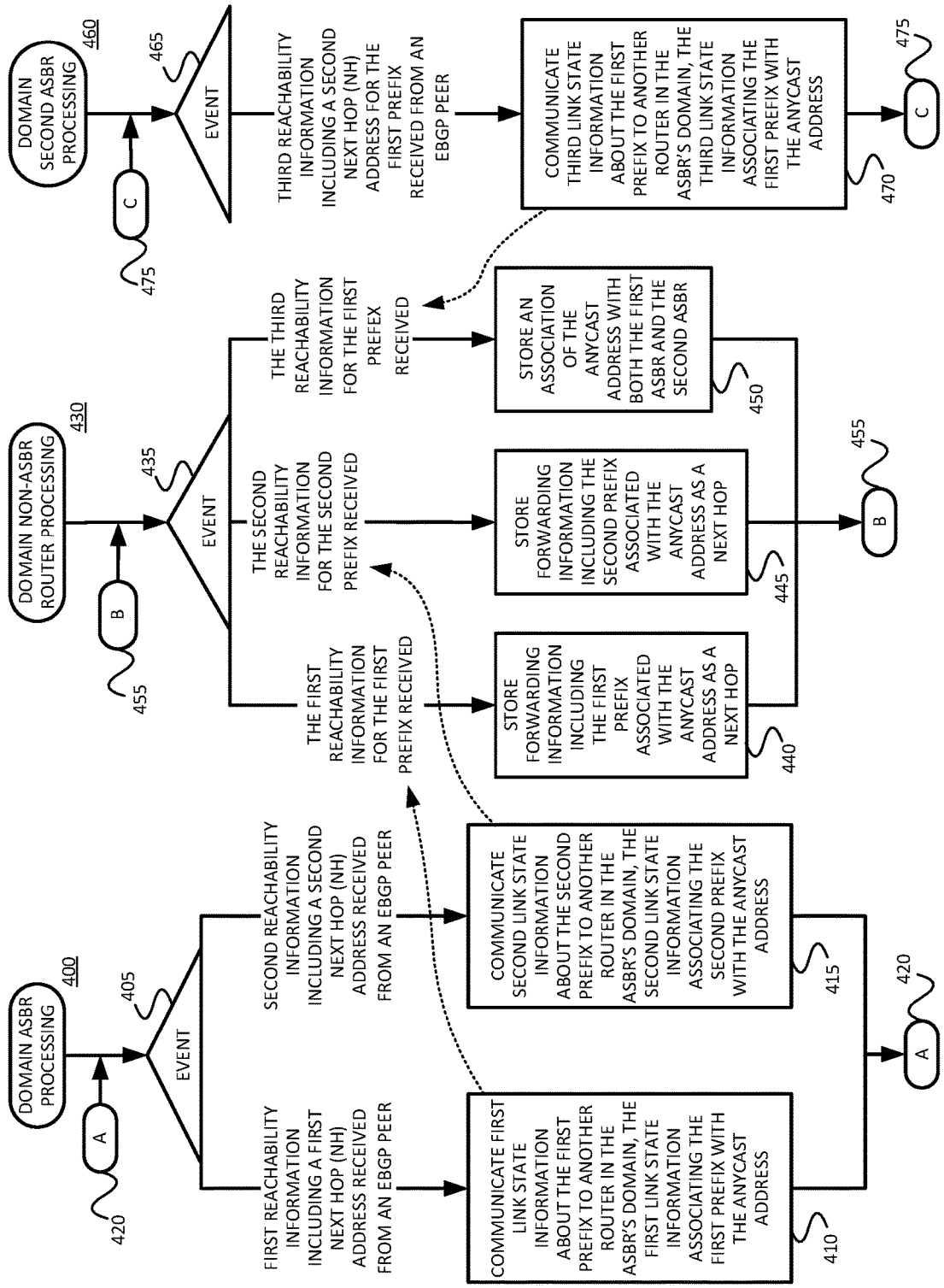

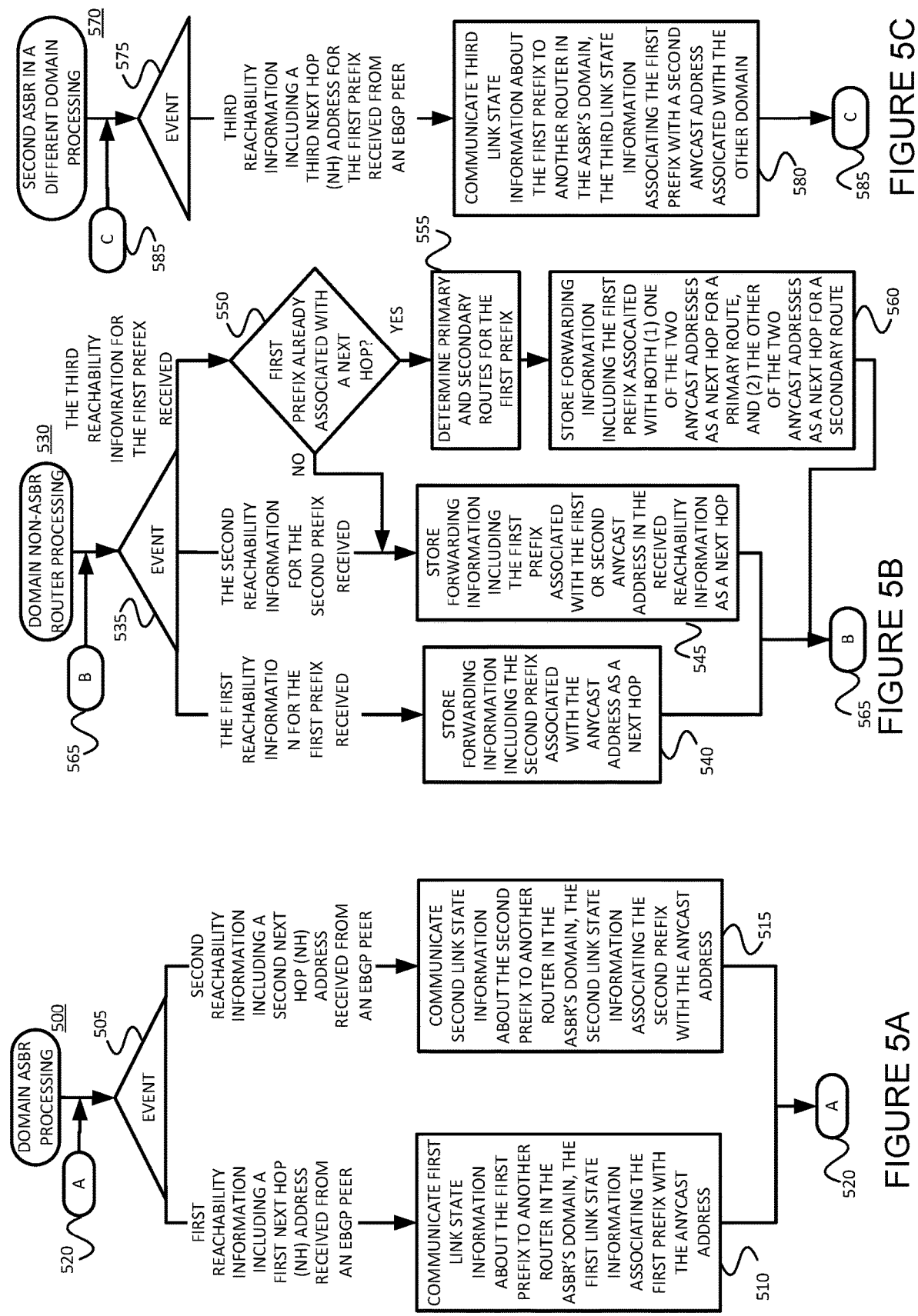

USING ANYCAST AS AN ABSTRACT NEXT HOP (ANH) TO REDUCE INFORMATION RELATED TO BORDER GATEWAY PROTOCL (BGP) NEXT HOPS RECEIVED BY AUTONOMOUS SYSTEM BORDER ROUTERS (ASBRS) AND/OR TO IMPROVE BGP PATH CONVERGENCE

§ 1. BACKGROUND

§ 1.1 Field of the Invention

Example embodiments consistent with the present invention concern network communications. In particular, at least some such example embodiments concern improving next hop communication and storage for prefixes in another autonomous system (AS).

§ 1.2 Background Information

In network communications systems, protocols are used by devices, such as routers for example, to exchange network information. Routers generally calculate routes used to forward data packets towards a destination. Some protocols, such as the Border Gateway Protocol ("BGP"), which is summarized in § 1.2.1 below, allow routers in different autonomous systems ("ASes") to exchange reachability information.

§ 1.2.1 the Border Gateway Protocol ("BGP")

The Border Gateway Protocol ("BGP") is an inter-Autonomous System routing protocol. The following refers to the version of BGP described in the document Y. Rekhter, T. Li, S. Hares, Eds., "A Border Gateway Protocol 4 (BGP-4)," *Request for Comments:* 4271 (Internet Engineering Task Force, January 2006) (incorporated herein by reference and referred to as "RFC 4271"). The primary function of a BGP speaking system is to exchange network reachability information with other BGP systems. This network reachability information includes information on the list of Autonomous Systems (ASes) that reachability information traverses. This information is sufficient for constructing a graph of AS connectivity, from which routing loops may be pruned, and, at the AS level, some policy decisions may be enforced.

It is normally assumed that a BGP speaker advertises to its peers only those routes that it uses itself. In this context, a BGP speaker is said to "use" a BGP route if it is the most preferred BGP route and is used in forwarding.

Generally, routing information exchanged via BGP supports only the destination-based forwarding paradigm, which assumes that a router forwards a packet based solely on the destination address carried in the IP header of the packet. This, in turn, reflects the set of policy decisions that can (and cannot) be enforced using BGP.

BGP uses the transmission control protocol ("TCP") as its transport protocol. This eliminates the need to implement explicit update fragmentation, retransmission, acknowledgement, and sequencing. When a TCP connection is formed between two systems, they exchange messages to open and confirm the connection parameters. The initial data flow is the portion of the BGP routing table that is allowed by the export policy, called the "Adj-Ribs-Out."

Incremental updates are sent as the routing tables change. BGP does not require a periodic refresh of the routing table. To allow local policy changes to have the correct effect without resetting any BGP connections, a BGP speaker should either (a) retain the current version of the routes advertised to it by all of its peers for the duration of the connection, or (b) make use of the Route Refresh extension.

KEEPALIVE messages may be sent periodically to ensure that the connection is live. NOTIFICATION messages are sent in response to errors or special conditions. If a connection encounters an error condition, a NOTIFICATION message is sent, and the connection is closed.

A BGP peer in a different AS is referred to as an external peer, while a BGP peer in the same AS is referred to as an internal peer. Internal BGP and external BGP are commonly abbreviated as iBGP and eBGP, respectively. If a BGP session is established between two neighbor devices (i.e., two peers) in different autonomous systems, the session is external BGP (eBGP), and if the session is established between two neighbor devices in the same AS, the session is internal BGP (iBGP).

If a particular AS has multiple BGP speakers and is providing transit service for other ASes, then care must be taken to ensure a consistent view of routing within the AS. A consistent view of the interior routes of the AS is provided by the interior gateway protocol (IGP) used within the AS. In some cases, it is assumed that a consistent view of the routes exterior to the AS is provided by having all BGP speakers within the AS maintain interior BGP ("iBGP") with each other.

Many routing protocols have been designed to run within a single administrative domain. These are known collectively as "Interior Gateway Protocols" ("IGPs"). Common examples of IGPs include Open Shortest Path First ("OSPF") and Intermediate System-Intermediate System ("IS-IS"). Typically, each link within an AS is assigned a particular "metric" value. The path between two nodes can then be assigned a "distance" or "cost", which is the sum of the metrics of all the links that belong to that path. An IGP typically selects the "shortest" (minimal distance, or lowest cost) path between any two nodes, perhaps subject to the constraint that if the IGP provides multiple "areas", it may prefer the shortest path within an area to a path that traverses more than one area. Typically, the administration of the network has some routing policy that can be approximated by selecting shortest paths in this way.

BGP, as distinguished from the IGPs, was designed to run over an arbitrarily large number of administrative domains (e.g., autonomous systems ("ASes")) with limited coordination among the various administrations. Both iBGP and IGP typically run simultaneously on devices of a single AS and complement each other. The BGP speaker that imports network destination reachability from an eBGP session to iBGP sessions, sets the BGP Next Hop ("NH") attribute in an iBGP update. The BGP NH attribute is an IP address. Other iBGP speakers within the AS, upon recipient of the above iBGP update, consult IGP for reachability of BGP NH and its cost. If BGP NH is unreachable, the entire iBGP update is invalid. Otherwise, the IGP cost of reaching BGP NH is considered during BGP best path selection.

§ 1.2.1.1 Example Environment

FIG. 1A illustrates an example environment 100 used to illustrate certain features of BGP. The example environment 100 includes multiple autonomous systems (ASes 110*a*, 110*b*, . . . 110*c*). The ASes 110*a*-110*c* include BGP routers 105*a*-105*e*. BGP routers within an AS generally run iBGP, while BGP routers peering with a BGP router in another AS generally run eBGP. As shown, BGP router 105*b* and 105*c* are peers (also referred to as "BGP speakers") in a BGP session (depicted as 120). During the BGP session 120, the BGP speakers 105b and 105c may exchange BGP update messages. Details of the BGP update message 190 are described in § 1.2.1.2 below.

§ 1.2.1.2 BGP "Update" Messages

In BGP, UPDATE messages are used to transfer routing information between BGP peers. The information in the UPDATE message can be used to construct a graph that describes the relationships of the various autonomous systems. More specifically, an UPDATE message is used to advertise feasible routes that share a common set of path attribute value(s) to a peer (or to withdraw multiple unfeasible routes from service). An UPDATE message may simultaneously advertise a feasible route and withdraw multiple unfeasible routes from service.

The UPDATE message 190 includes a fixed-size BGP header, and also includes the other fields, as shown in FIG. 1A. (Note some of the shown fields may not be present in every UPDATE message). Referring to FIG. 1A, the "Withdrawn Routes Length" field 130 is a 2-octets unsigned integer that indicates the total length of the Withdrawn Routes field 140 in octets. Its value allows the length of the Network Layer Reachability Information ("NLRI") field 170 to be determined, as specified below. A value of 0 indicates that no routes are being withdrawn from service, and that the WITHDRAWN ROUTES field 140 is not present in this UPDATE message 190.

The "Withdrawn Routes" field 140 is a variable-length field that contains a list of IP address prefixes for the routes that are being withdrawn from service. Each IP address prefix is encoded as a 2-tuple 140' of the form <length, prefix>. The "Length" field 142 indicates the length in bits of the IP address prefix. A length of zero indicates a prefix that matches all IP addresses (with prefix, itself, of zero octets). The "Prefix" field 144 contains an IP address prefix, followed by the minimum number of trailing bits needed to make the end of the field fall on an octet boundary. Note that the value of trailing bits is irrelevant.

Still referring to FIG. 1A, the "Total Path Attribute Length" field 150 is a 2-octet unsigned integer that indicates the total length of the Path Attributes field 160 in octets. Its value allows the length of the Network Layer Reachability Information ("NLRI") field 170 to be determined. A value of 0 indicates that neither the Network Layer Reachability Information field 170 nor the Path Attribute field 160 is present in this UPDATE message.

The "Path Attributes" field 160 is a variable-length sequence of path attributes that is present in every UPDATE message, except for an UPDATE message that carries only the withdrawn routes. Each path attribute is a triple <attribute type, attribute length, attribute value> of variable length. The "Attribute Type" is a two-octet field that consists of the Attribute Flags octet, followed by the Attribute Type Code octet.

Finally, the "Network Layer Reachability Information" field 170 is a variable length field that contains a list of Internet Protocol ("IP") address prefixes. The length, in octets, of the Network Layer Reachability Information is not encoded explicitly, but can be calculated as: UPDATE message Length−23−Total Path Attributes Length (Recall field 150.)−Withdrawn Routes Length (Recall field 130.) where UPDATE message Length is the value encoded in the fixed-size BGP header, Total Path Attribute Length, and Withdrawn Routes Length are the values encoded in the variable part of the UPDATE message, and 23 is a combined length of the fixed-size BGP header, the Total Path Attribute Length field, and the Withdrawn Routes Length field.

Reachability information is encoded as one or more 2-tuples of the form <length, prefix> 170', whose fields are shown in FIG. 1A and described here. The "Length" field 172 indicates the length in bits of the IP address prefix. A length of zero indicates a prefix that matches all IP addresses (with prefix, itself, of zero octets). The "Prefix" field 174 contains an IP address prefix, followed by enough trailing bits to make the end of the field fall on an octet boundary. Note that the value of the trailing bits is irrelevant.

Referring to FIG. 1B, the document T. Bates, et al, "Multiprotocol Extensions for BGP-4," *Request for Comments* 4760 (Internet Engineering Task Force, January 2007) (referred to as "RFC 4760" and incorporated herein by reference) describes a way to use the path attribute(s) field 160 of a BGP update message 100 to carry routing information for multiple Network Layer protocols (such as, for example, IPv6, IPX, L3VPN, etc.) More specifically, RFC 4760 defines two new path attributes—(1) Mulitprotocol Reachable NLRI ("MP_Reach_NLRI") and (2) Multiprotocol Unreachable NLRI ("MP_Unreach_NLRI"). The first is used to carry the set of reachable destinations together with next hop ("NH") information to be used for forwarding to these destinations, while the second is used to carry a set of unreachable destinations. Only MP_Reach_NLRI is discussed below.

Referring to FIG. 1B, the MP_Reach_NLRI "path attribute" 160' includes an address family identifier ("AFI") (2 octet) field 161, a subsequent address family identifier ("SAFI") (1 octet) field 162, a length of Next Hop Network Address (1 octet) field 163, a Network Address of Next Hop (variable) field 164, a Reserved (1 octet) field 165 and a Network Layer Reachability Information (variable) field 166. The AFI and SAFI fields 161 and 162, in combination, identify (1) a set of Network Layer protocols to which the address carried in the Next Hop field 164 must belong, (2) the way in which the address of the Next Hop is encoded, and (3) the semantics of the NLRI field 166. The Network Address of Next Hop field 164 contains the Network Address of the next router on the path to the destination system. The NLRI field 166 lists NLRI for feasible routes that are being advertised in the path attribute 160. That is, the next hop information carried in the MP_Reach_NLRI 160' path attribute defines the Network Layer address of the router that should be used as the next hop to the destination(s) listed in the MP NLRI attribute in the BGP Update message.

An UPDATE message can advertise, at most, one set of path attributes (Recall field 160), but multiple destinations, provided that the destinations share the same set of attribute value(s). All path attributes contained in a given UPDATE message apply to all destinations carried in the NLRI field 170 of the UPDATE message.

As should be apparent from the description of fields 130 and 140 above, an UPDATE message can list multiple routes that are to be withdrawn from service. Each such route is identified by its destination (expressed as an IP prefix), which unambiguously identifies the route in the context of the BGP speaker-BGP speaker connection to which it has been previously advertised.

An UPDATE message might advertise only routes that are to be withdrawn from service, in which case the message will not include path attributes 160 or Network Layer Reachability Information 170. Conversely, an UPDATE message might advertise only a feasible route, in which case the WITHDRAWN ROUTES field 140 need not be present.

An UPDATE message should not include the same address prefix in the WITHDRAWN ROUTES field 140 and Network Layer Reachability Information field 170 or "NLRI" field in the MP_REACH_NLRI path attribute field 166.

§ 1.2.1.3 BGP Peering and Data Stores: The Conventional "RIB" Model

FIG. 2 is a diagram illustrating a conventional BGP RIB model in which a BGP speaker interacts with other BGP speakers (peers). (Recall, for example, that in FIG. 1, BGP routers 105b and 105c are peers (also referred to as "BGP speakers") in a BGP session (depicted as 120).) In FIG. 2, a BGP peer 210 has a session with one or more other BGP peers 250. The BGP peer 210 includes an input (for example, a control plane interface, not shown) for receiving, from at least one outside BGP speaker 250, incoming routing information 220. The received routing information is stored in Adj-RIBS-In storage 212. The information stored in Adj-RIBS-In storage 212 is used by a decision process 214 for selecting routes using the routing information. The decision process 214 generates "selected routes" as Loc-RIB information 216, which is used to construct forwarding database. The Loc-RIB information 216 that is to be advertised further to other BGP speakers is then stored in Adj-RIBS-Out storage 218. As shown by 230, at least some of the information in Adj-RIBS-Out storage 218 is then provided to at least one outside BGP speaker peer device 250 in accordance with a route advertisement process.

Referring to communications 220 and 230, recall that BGP can communicate updated route information using the BGP UPDATE message.

More specifically, IETF RFC 4271 documents a version of the BGP routing protocol. In it, the routing state of BGP is abstractly divided into three (3) related data stores (historically referred to as "information bases") that are created as part of executing the BGP pipeline. To reiterate, the Adj-RIBS-In 212 describes the set of routes learned from each (adjacent) BGP peer 250 for all destinations. The Loc-RIB 216 describes the result of the BGP decision process 214 (which may be thought of loosely as route selection) in choosing a best BGP route and other feasible (e.g., valid but not best) alternate routes. The Adj-RIBS-Out 218 describes the process of injecting the selected route from the Loc-RIB 216 (or possibly a foreign route from another protocol) and placing it for distribution to (adjacent) BGP peers 250 using the BGP protocol (Recall, e.g. the UPDATE messages 190/230).

§ 1.2.2 the Problem of Multiple Next Hops for a Given Prefix in Another Autonomous System When eBGP routes are received from a BGP peer (or BGP peers) by more than one asynchronous network border router (ASBR), in a common BGP deployment scenario, each ASBR may use either (A) iBGP with "next-hop unchanged," or (B) iBGP with "next-hop self," to advertise each route to its iBGP neighbors (e.g., routers in the same interior gateway protocol (IGP) domain. Each of these approaches, and their limitations, are discussed in the context of the example network 300 of FIG. 3A.

As shown in FIG. 3A, the example network 300 includes a first autonomous system 310 including BGP routers that peer with routers in an aggregate spine 320. In the example network, the aggregate spine 320 includes Clos 1 330a and Clos 2 330b. Clos 1 and Clos 2 are linked via ring router 0 338a and ring router 1 338b. Clos 1 330a and Clos 2 330b belong to the same IGP domain. Clos 1 330a includes spine router 1 332a, spine router 2 332b, leaf node router 1 336a and ring 0 338a. Spine router 1 and spine router 2 peer with the same, and/or different, and/or multiple, peer routers in AS 310. Spine router 1 and spine router 2 are each linked with leaf node router 1. Spine router 1 has a loopback IP address of 1.1.1.1, while spine router 2 has a loopback IP address of 1.1.1.2. Devices in customer network 350a can access routers in the AS 310 via Clos 1 (and perhaps Clos 2) of the aggregate spine 320. Similarly, Clos 2 330b includes spine router 3 332c, spine router 4 332d, leaf node router 2 336b and ring 1 338b. Spine router 3 and spine router 4 peer with the same, and/or different, and/or multiple, peer routers in AS 310. Spine router 3 and spine router 4 are each linked with leaf node router 2. The loopback IP addresses of spine router 3 and spine router 4 are not shown. Devices in customer network 350b can access routers in the AS 310 via Clos 2 (and perhaps Clos 1) of the aggregate spine 320.

Generally, spine routers 1-4 act as ASBRs and have eBGP peering sessions with one or more peer routers in autonomous system 310. Leaf node router 1 336a can communicate with customer network 350a, and leaf node router 2 336b can communicate with customer network 350b. A device in customer network 350a may reach a device in, or reachable via, autonomous system 310 via the aggregate spine 320. The device has an Internet protocol ("IP") address. Leaf node router 1 336a may send one or more packets destined for the device via spine router 1 and/or via spine router 2 (e.g., as primary and backup paths, or as equal cost multipath (ECMP) paths). If the spine routers 1 and 2 are down, or if the links between the spine routers 1 and 2 and the autonomous system 310 are down, the packet(s) destined for the device may be sent via spine router 1 and/or spine router 2, ring router 0, ring router 1, and spine router 3 and/or spine router 4.

In a first approach ("next hop unchanged"), each ASBR advertises all next hops (NHs) from an eBGP peer to a route reflector (RR) (not shown) using BGP "add-path." This is referred to as "next-hop unchanged." Referring to FIG. 3B, in the network 300, spine router 1 receives a next-hop for each of prefixes A and B from an eBGP peer(s) in AS 310. This information 365,370 may be included in one or more BGP update messages. (Recall, e.g., 190 of FIG. 1A.) Similarly, spine router 2 receives the same or different next-hop for each of prefixes A and B from the same or different eBGP peer(s) in AS 310. This information 380,385 may be included in one or more BGP update messages. Although the RR is not shown, it can send such information 375,390, via iBGP or an IGP, to leaf node router 1 336a. The leaf node router 1 can process and store this information in a forwarding table 395 as (1) an entry for prefix A in which the next-hop is an equal cost multi-path (ECMP) including next hop 2.2.2.xa and next hop 2.2.2.ya, and (2) an entry for prefix B in which the next-hop is an equal cost multi-path (ECMP) including next hop 2.2.2.xb and next hop 2.2.2.yb. As can be seen, the next hops stored as forwarding information 2.2.2.xa, 2.2.2.xb, 2.2.2.ya, 2.2.2.yb are "unchanged" from the next hops received from the eBGP peers in AS 310. In summary, when next hop unchanged is used, an ASBR (e.g., a spine router), when it advertises an externally learned prefix into iBGP, does not modify the BGP next hop. Rather, the BGP next hop is typically set to the IP address of an interface on the peering router in the external AS 310.

Unfortunately, next hop unchanged is not recommended because all NHs are exported into the IGP by their ASBRs. Each ASBR advertises only one path per prefix to its RR.

The RR may propagate the advertised path through its corresponding AS by means of iBGP ADD-PATH.

That is, one drawback of using next hop self is a BGP Routing Information Base (RIB) scale that is proportional to the number of inter-AS links. Thus, the number of paths learned per prefix is (or can be) equal to number of ASBRs servicing a given peer AS. In this example, there are two paths for prefix A, two paths for prefix B, and two spine routers. Image, however, a Clos with many more spine routers. The next hop unchanged approach becomes difficult to scale as the number of spine routers increases. Indeed, the scale requirements of this solution is on par with "next hop self," described next with reference to FIG. 3C. (See, e.g., section 1.2.1 of the document, draft-szarecki-grow-abstract-nh-scaleout-peering-00 (Internet Engineering Task Force, February 2019) (incorporated herein by reference).)

Further, although next hop unchanged provides a means of fast, prefix-scale-independent traffic switchover, it does so only if an ASBR external interface goes down, which triggers an IGP event. If, however, an eBGP session fails but the underlying interface remains up (e.g., due to misconfiguration, software defect, etc.), recovery still requires per-prefix withdrawal/update that could take many minutes at high scale.

In the second approach, each ASBR advertise all received routes with a next hop set to its own loopback IP address ("next hop self"). Referring to FIG. 3C, in the network 300, spine router 1 receives a next-hop for each of prefixes A and B from an eBGP peer(s) in AS 310. This information 365,370 may be included in one or more BGP update messages. (Recall, e.g., 190 of FIG. 1A.) Similarly, spine router 2 receives the same or different next-hop for each of prefixes A and B from the same or different eBGP peer(s) in AS 310. This information 380,385 may be included in one or more BGP update messages. As shown by 375', spine router 1 replaces the received next hops with its loopback address (1.1.1.1), and this information 375' is communicated, via iBGP or an IGP, to leaf node router 1 336a. Similarly, as shown by 390', spine router 2 replaces the received next hops with its loopback address (1.1.1.2), and this information 390' is communicated, via iBGP or an IGP, to leaf node router 1 336a. The leaf node router 1 can process and store this information in a forwarding table 395' as (1) an entry for prefix A in which the next-hop is an equal cost multi-path (ECMP) including next hop 1.1.1.1 and next hop 1.1.1.2, and (2) an entry for prefix B in which the next-hop is an equal cost multi-path (ECMP) including next hop 1.1.1.1 and next hop 1.1.1.2. These next hops can forward a packet destined for prefix A or prefix B to either spine router 1 or spine router 2, which have sufficient forwarding information to forward such a packet on to the appropriate BGP peer router in AS 310. Thus, with next hop self, an ASBR modifies a BGP next hop learned from a peer in another AS to a local IP address (typically, the ASBR's loopback address) when it advertises the externally learned path into iBGP.

Next hop self allows the number of paths per prefix to be reduced, while keeping optimal forwarding (e.g., least cost and ECMP). In fact, because IP addresses of a BGP next hop, as seen by other BGP speakers, do not change in response to external failure events and are resolvable by the IGP, there is no need to reprogram the Forwarding Information Base (FIB) at all. Unfortunately, however, "next hop self" is also not recommended in certain cases because other failures (e.g., loss of all connectivity between a single ASBR and an external AS would not be handled quickly. More specifically, since a BGP next hop advertised by an ASBR is not changed and is reachable by the IGP, BGP speakers will keep the ASBR as a feasible exit point until they receive BGP withdraws on a prefix-by-prefix basis. This is a global convergence process that at high scale can take minutes, during which time packets may be discarded or loop. (See, e.g., section 1.2.2 of the document, draft-szarecki-grow-abstract-nh-scaleout-peering-00 (Internet Engineering Task Force, February 2019).)

The document, draft-szarecki-grow-abstract-nh-scaleout-peering-00 (Internet Engineering Task Force, February 2019) addresses problems with Next Hop Unchanged and Next Hop Self.

In view of the foregoing, it would be useful to reduce next hops on a non-ASBR in an IGP domain (e.g., on a leaf node in a Clos of an aggregate spine). This will allow BGP PIC (See the document, A. Bashandy, "BGP Prefix Independent Convergence.," draft-ietf-rtgwg-bgp-pic-11 (Internet Engineering Task Force, Feb. 10, 2020)) to perform better since there will be less NHs to track. Such a solution should allow the non-ASBR (e.g., leaf node router) to reach prefixes in another, connected, AS. Such a solution should also permit fast recovery in the event of one or more link failures between ASBRs (e.g., spine routers) and peer router(s) in an external AS.

§ 2. SUMMARY OF THE INVENTION

The number of next hops related to a prefix learned by two or more ASBRs (e.g., one or more spine routers in a Clos of an aggregate spine) via eBGP, stored as forwarding information on a non-ASBR in an IGP domain (e.g., on a leaf node in a Clos of an aggregate spine) may be reduced by a method, for use in a system including a first autonomous system border router (ASBR) and another router, both provided in a first domain in which routers share a first anycast address, the method comprising: (a) receiving by the first ASBR, from an exterior Border Gateway Protocol (eBGP) peer, first reachability information for a first prefix, the first reachability information including a first next hop (NH) address; (b) communicating by the first ASBR, first link state information about the first prefix to the other router, the first link state information associating the first prefix with the first anycast address; (c) receiving by the first ASBR, from an eBGP peer, second reachability information for a second prefix, the second reachability information including a second next hop (NH) address; (d) communicating by the first ASBR, second link state information about the second prefix to the other router, the second link state information associating the second prefix with the first anycast address; (e) receiving by the other router, the first reachability information for the first prefix and the second reachability information for the second prefix; and (f) storing by the other router, forwarding information, the forwarding information including (1) the first prefix associated with the first anycast address, the first anycast address provided as a next hop for the first prefix, and (2) the second prefix associated with the first anycast address, the first anycast address provided as a next hop for the second prefix.

If the system further includes a second ASBR provided in the first domain, the example method may further comprise: (g) receiving by the second ASBR, from an exterior Border Gateway Protocol (eBGP) peer, third reachability information for the first prefix, the third reachability information including a second next hop (NH) address; (h) communicating by the second ASBR, third link state information about the first prefix to the other router, the third link state information associating the first prefix with the first anycast address; (i) receiving by the other router, the third reachability information for the first prefix; and (j) storing by the other router, forwarding information, the forwarding information including (1) the first prefix associated with the first anycast address, the first anycast address provided as a next hop for the first prefix, (2) an association of the first anycast address with both the first ASBR and the second ASBR, and (3) the second prefix associated with the first anycast address, the first anycast address provided as a next hop for the second prefix. In some such example methods, the first ASBR and the second ASBR are associated with the first anycast address as equal cost multipaths (ECMPs).

In some of the foregoing example methods, the system further includes a second ASBR provided in a second domain in which routers share a second anycast address, the second domain being separate from the first domain but belonging to an interior gateway protocol (IGP) domain to which the first domain also belong. In this case, the method further comprises: (g) receiving by the second ASBR, from an exterior Border Gateway Protocol (eBGP) peer, third reachability information for the first prefix, the third reachability information including a second next hop (NH) address; (h) communicating by the second ASBR, third link state information about the first prefix to the other router, the third link state information associating the first prefix with the second anycast address associated with the second domain; (i) receiving by the other router, the third reachability information for the first prefix; and (j) storing by the other router, forwarding information, the forwarding information including (1) the first prefix associated with the first anycast address, the first anycast address provided as a next hop for the first prefix in a primary route, (2) the first prefix associated with the second anycast address, the second anycast address provided as a next hop for the first prefix in a secondary route, and (3) the second prefix associated with the first anycast address, the first anycast address provided as a next hop for the second prefix.

In at least some of the foregoing example methods, the first anycast address is an abstract next hop.

In at least some of the foregoing example methods, the domain has a Clos network topology, the first ASBR is a spine node, and the other router is a leaf node.

In at least some of the foregoing example methods, the eBGP peer from which the first reachability information for the first prefix was received is the same as the eBGP peer from which the second reachability information for the second prefix was received. In at least some other of the foregoing example methods, the eBGP peer from which the first reachability information for the first prefix was received is different from the eBGP peer from which the second reachability information for the second prefix was received.

One example method may be used in an autonomous system border router (ASBR) being provided in a domain in which routers share an anycast address, the method comprising: (a) receiving, from an exterior Border Gateway Protocol (eBGP) peer, first reachability information for a first prefix, the first reachability information including a first next hop (NH) address; (b) communicating first link state information about the first prefix to another router in the domain, the first link state information associating the first prefix with the anycast address; (c) receiving, from an eBGP peer, second reachability information for a second prefix, the second reachability information including a second next hop (NH) address; and (d) communicating second link state information about the second prefix to the other router in the domain, the second link state information associating the second prefix with the anycast address.

In at least some such methods, the anycast address is a next hop such as, for example, an abstract next hop.

The domain may have a Clos network topology, in which case, the ASBR is a spine node, and the other router is a leaf node.

In at least some such methods, the eBGP peer from which the first reachability information for the first prefix was received is the same as the eBGP peer from which the second reachability information for the second prefix was received. Alternatively, the eBGP peer from which the first reachability information for the first prefix was received may be different from the eBGP peer from which the second reachability information for the second prefix was received.

Any of the foregoing example methods may be implemented on an ASBR, such as on a spine router of a Clos.

Any of the foregoing methods may be implemented as processor-executable code stored on a non-transitory storage medium.

§ 3. BRIEF DESCRIPTION OF THE DRAWINGS

FIGS. 4A-4C are flow diagrams of example methods for configuring (and using) an autonomous system border router (ASBR), such as a spine router in a Clos network, in a manner consistent with the present description.

FIGS. 5A-5C are flow diagrams of example methods for configuring (and using) an autonomous system border router (ASBR), such as a spine router in a Clos network, in a manner consistent with the present description.

§ 4. DETAILED DESCRIPTION

Figure 1A:
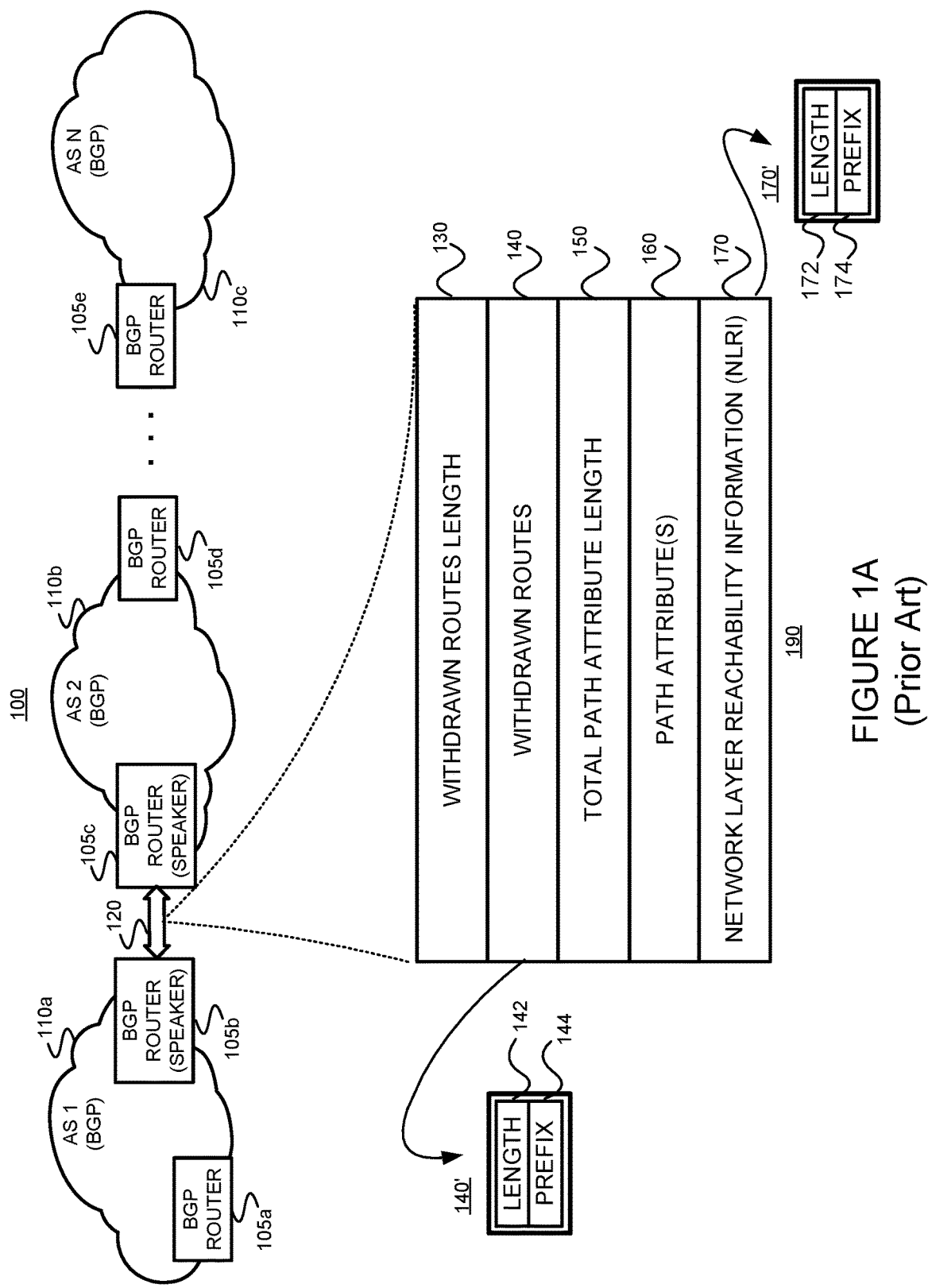
FIG. 1A illustrates parts of a conventional BGP update message sent from one BGP router in one autonomous system (AS) to other BGP router in another AS, and FIG. 1B illustrates parts of a path attribute field in such a BGP update message.
Figure 1B:
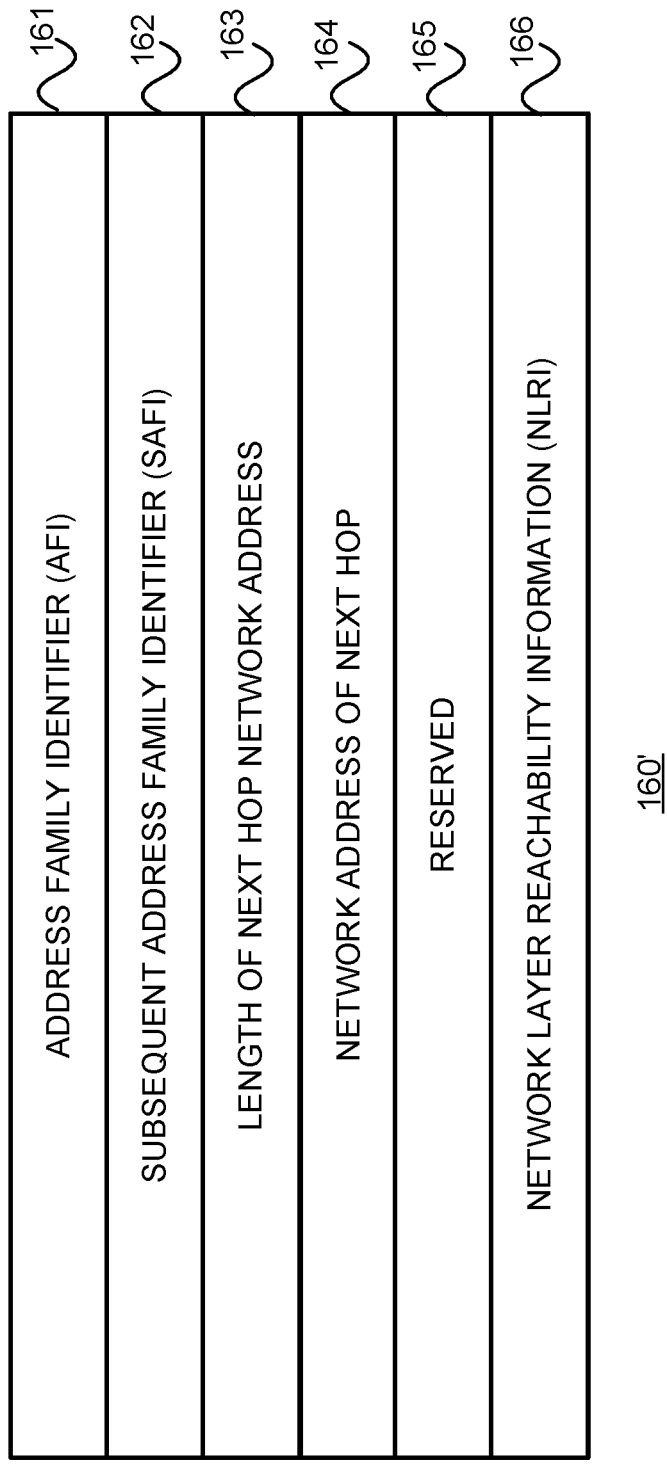
Figure 2:
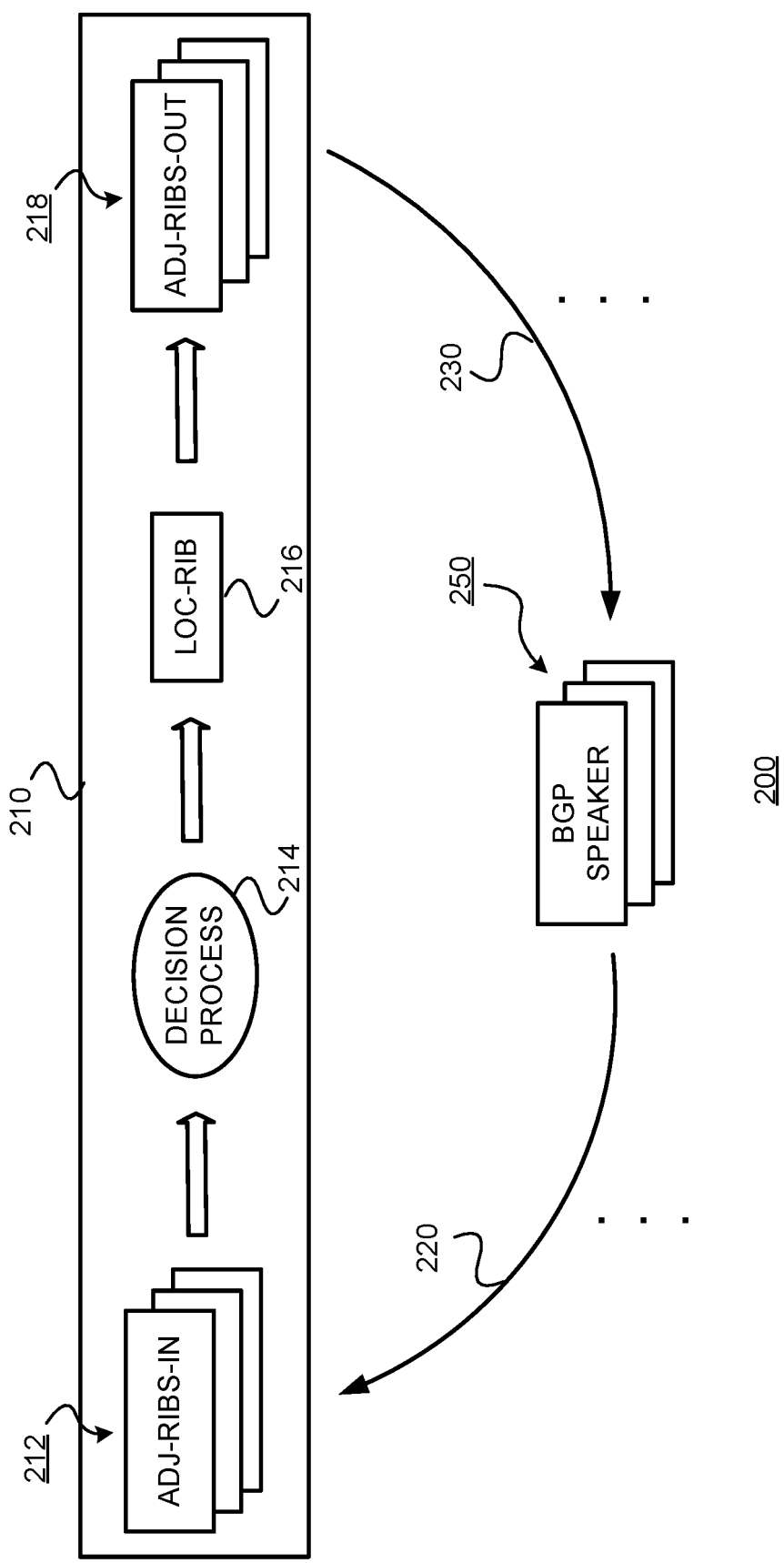
FIG. 2 illustrates a conventional BGP RIB model in which a BGP speaker interacts with other BGP speakers (peers).

The present description may involve novel methods, apparatus, message formats, and/or data structures for reducing the number of next hops related to a prefix learned by two or more ASBRs (e.g., one or more spine routers in a Clos of an aggregate spine) via eBGP, stored as forwarding information on a non-ASBR in an IGP domain (e.g., on a leaf node in a Clos of an aggregate spine). The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

FIGS. 4A-4C are flow diagrams of example methods 400,430,460 for configuring (and using) an autonomous system border router (ASBR), such as a spine router in a Clos network, in a manner consistent with the present description. Referring back to FIG. 3A, these example methods 400,430,460 concern operations in a domain with a single anycast IP address (e.g., Clos 1 alone, or Clos 2 alone). Referring to FIGS. 4A-4C, the example methods 400,430,460 collectively may be used in a system including a first autonomous system border router (ASBR) (e.g., a spine router), which may run example method 400, a second ASBR, which may run example method 460, and another router (e.g., a leaf node router), which may run example method 430, all of which are provided in a first domain (e.g., a Clos) in which routers share a first anycast address.

Referring first to example method 400 run by the first ASBR, different branches of the example method 400 are performed in response to certain events. (Event branch point 405) Responsive to the first ASBR receiving, from an exterior Border Gateway Protocol (eBGP) peer in another AS, first reachability information for a first prefix, the first reachability information including a first next hop (NH) address, the example method 400 communicates first link state information about the first prefix to the other router, the first link state information associating the first prefix with the first anycast address. (Block 410) The example method 400 then branches back to event branch point 405 (via flowchart node A 420). Responsive to the first ASBR receiving, from an eBGP peer (which may be the same as, or different from, the earlier eBGP peer), second reachability information for a second prefix, the second reachability information including a second next hop (NH) address, the example method 400 communicates second link state information about the second prefix to the other router, the second link state information associating the second prefix with the first anycast address. (Block 415) The example method 400 then branches back to event branch point 405 (via flowchart node A 420).

Referring next to example method 430 run by the non-ASBR router, different branches of the example method 430 are performed responsive to the occurrence of different events. (Event branch point 435) For example, responsive to receiving the first reachability information for the first prefix, the example method 430 stores forwarding information including the first prefix associated with the first anycast address, wherein the first anycast address is provided as a next hop for the first prefix. (Block 440) The example method 430 then branches back to event branch point 435 (via flowchart node B 455). Referring back to event branch point 435, responsive to receiving the second reachability information for the second prefix, the example method 430 stores forwarding information including the second prefix associated with the first anycast address, wherein the first anycast address is provided as a next hop for the second prefix. (Block 445) The example method 430 then branches back to event branch point 435 (via flowchart node B 455).

As can be appreciated from the foregoing, the non-ASBR router stores only one next hop for more than one prefix learned from two eBGP sessions with one or more eBGP peers. This scalability advantage continues if there are more prefixes learned from more eBGP sessions.

Referring now to FIG. 4C, the example method 460 may be performed by the second ASBR provided in the first domain. Referring to event branch point 465, responsive to receiving by the second ASBR, from an exterior Border Gateway Protocol (eBGP) peer, third reachability information for the first prefix, the third reachability information including a second next hop (NH) address, the example method 460 communicates third link state information about the first prefix to the other router, the third link state information associating the first prefix with the first anycast address. (Block 470) The example method 460 then branches back to event branch point 465 (via flowchart node C 475).

Referring back to event branch point 435 of FIG. 4B, responsive to receiving, by the non-ASBR router, the third reachability information for the first prefix, the example method 430 stores forwarding information including the first prefix associated with the first anycast address, the first anycast address provided as a next hop for the first prefix, as well as an association of the first anycast address with both the first ASBR and the second ASBR. For example, in some example methods, the first ASBR and the second ASBR are associated with the first anycast address as equal cost multipaths (ECMPs).

In some examples of the foregoing methods 400,430,460, the first anycast address is provided as an abstract next hop (ANH).

In some examples of the foregoing methods 400,430,460, the domain has a Clos network topology, the first ASBR is a spine node, the second ASBR is another spine node, and the other (non-ASBR) router is a leaf node.

In some examples of the foregoing methods 400,430,460, the eBGP peer from which the first reachability information for the first prefix was received is the same as the eBGP peer from which the second reachability information for the second prefix was received. In other examples, the eBGP peer from which the first reachability information for the first prefix was received is different from the eBGP peer from which the second reachability information for the second prefix was received.

FIGS. 5A-5C are flow diagrams of example methods 500,530,570 for configuring (and using) an autonomous system border router (ASBR), such as a spine router in a Clos network, in a manner consistent with the present description. Referring back to FIG. 3A, these example methods 500,530,570 concern operations in more than one domain with more than one anycast IP address (e.g., Clos 1 and Clos 2), but both of which domains belong to the same IGP domain.

Referring first to example method 500 run by the first ASBR, different branches of the example method 500 are performed in response to certain events. (Event branch point 505) Responsive to the first ASBR receiving, from an exterior Border Gateway Protocol (eBGP) peer in another AS, first reachability information for a first prefix, the first reachability information including a first next hop (NH) address, the example method 500 communicates first link state information about the first prefix to the other router, the first link state information associating the first prefix with the first anycast address. (Block 510) The example method 500 then branches back to event branch point 505 (via flowchart node A 520). Responsive to the first ASBR receiving, from an eBGP peer (which may be the same as, or different from, the earlier eBGP peer), second reachability information for a second prefix, the second reachability information including a second next hop (NH) address, the example method 500 communicates second link state information about the second prefix to the other router, the second link state information associating the second prefix with the first anycast address. (Block 515) The example method 500 then branches back to event branch point 505 (via flowchart node A 520).

Referring next to example method 530 run by the non-ASBR router, different branches of the example method 530 are performed responsive to the occurrence of different events. (Event branch point 535) For example, responsive to receiving the first reachability information for the first prefix, the example method 530 stores forwarding information including the first prefix associated with the first anycast address, wherein the first anycast address is provided as a next hop for the first prefix. (Block 540) The example method 530 then branches back to event branch point 535 (via flowchart node B 565). Referring back to event branch point 535, responsive to receiving the second reachability information for the second prefix, the example method 530 stores forwarding information including the second prefix associated with the first anycast address, wherein the first anycast address is provided as a next hop for the second prefix. (Block 545) The example method 530 then branches back to event branch point 535 (via flowchart node B 565). Thus far, the example methods 500 and 530 of FIGS. 5A and 5B are identical to the example methods 400 and 430 of FIGS. 4A and 4B, respectively.

Referring to FIG. 5C, the example method 570 may be performed by a second ASBR provided in a second domain in which routers share a second anycast address, the second domain being separate from the first domain but belonging to an interior gateway protocol (IGP) domain to which the first domain also belongs. Referring to event branch point 575, responsive to receiving, from an exterior Border Gateway Protocol (eBGP) peer, third reachability information for the first prefix, the third reachability information including a third next hop (NH) address, the example method 570 communicates third link state information about the first prefix to the other (non-ASBR) router, the third link state information associating the first prefix with the second anycast address associated with the second domain. (Block 580) The example method 570 then branches back to event branch point 575 (via flowchart node C 585).

Referring back to event branch point 535 of FIG. 5B, responsive to receiving the third reachability information for the first prefix, the example method 530 can determine whether or not the first prefix is already associated with a next hop. (Decision 550) If not (Decision 550=NO), the method 530 may store forwarding information, the forwarding information including the first prefix associated with the second anycast address. (Block 545) The example method 530 then branches back to event branch point 535 (via flowchart node B 565). If, on the other hand, the first prefix is already associated with a next hop (Decision 550=YES), the example method 530 may determine primary and secondary routes for the first prefix (e.g., by an open shortest path first (OSPF) algorithm) (Block 555) and store forwarding information including the first prefix associated with the first (or second, depending on the determination at block 555) anycast address, the first (or second) anycast address provided as a next hop for the first prefix in a primary route, (2) the first prefix associated with the second (or first, depending on the determination at block 555) anycast address, the second (or first) anycast address provided as a next hop for the first prefix in a secondary route. (Block 560) The example method 530 then branches back to event branch point 535 (via flowchart node B 565).

In some examples of the foregoing methods 500,530,570, the first anycast address is provided as an abstract next hop (ANH).

In some examples of the foregoing methods 500,530,570, each domain has a Clos network topology, the first ASBR is a spine node in a first Clos network, the second ASBR is another spine node in a second Clos network, and the other (non-ASBR) router is a leaf node in one of the Clos networks.

In some examples of the foregoing methods 500,530,570, the eBGP peer from which the first reachability information for the first prefix was received is the same as the eBGP peer from which the second reachability information for the second prefix was received. In other examples, the eBGP peer from which the first reachability information for the first prefix was received is different from the eBGP peer from which the second reachability information for the second prefix was received. Similarly, the eBGP peer from which the third reachability information for the first prefix was received may be the same as, or different from, the eBGP peer from which the first reachability information for the first prefix was received. Likewise, the eBGP peer from which the third reachability information for the first prefix was received may be the same as, or different from, the eBGP peer from which the second reachability information for the second prefix was received.

§ 4.2 Example Apparatus

Figure 6:
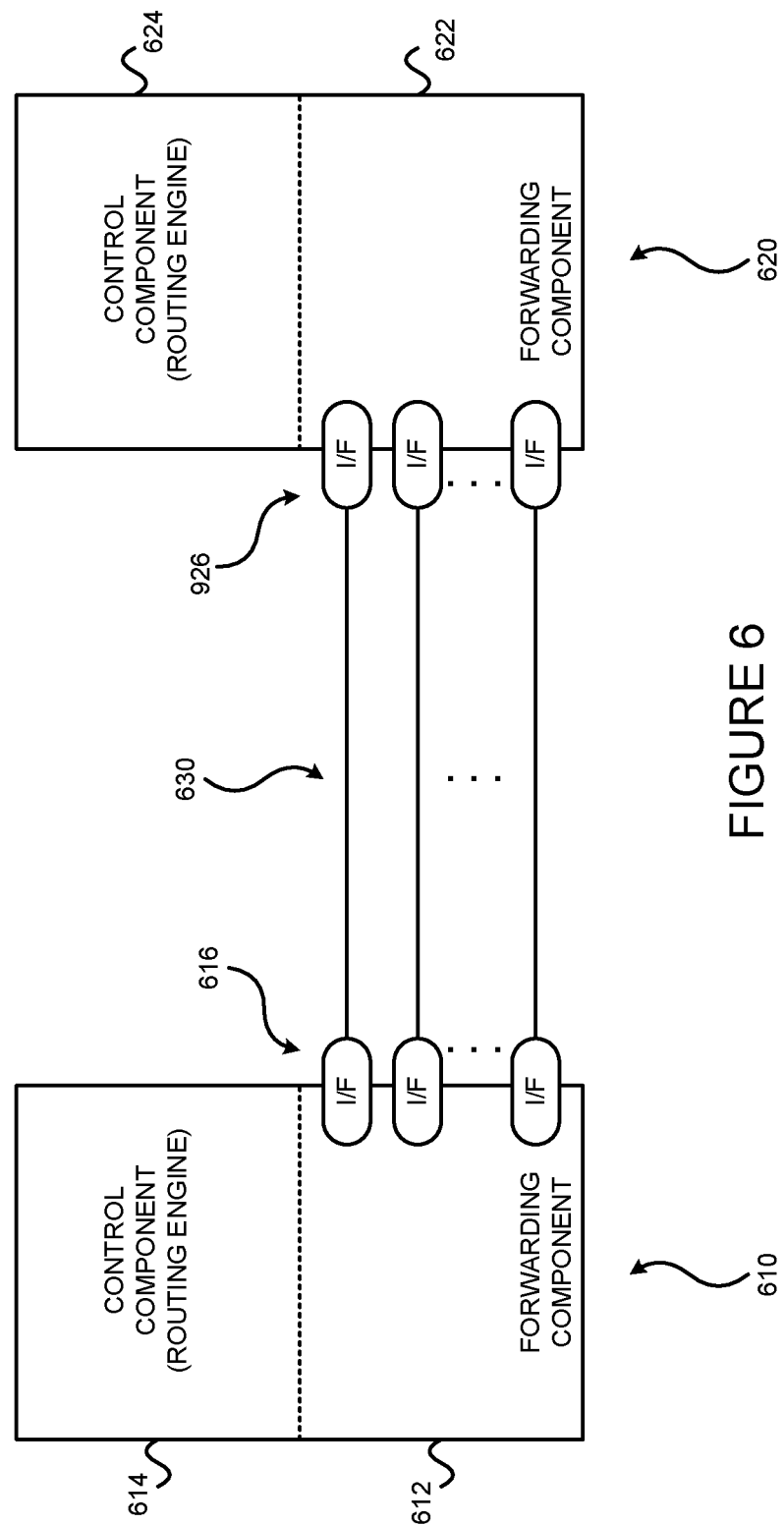
FIG. 6 illustrates an example environment including two systems coupled via communications links.

The data communications network nodes may be forwarding devices, such as routers for example. FIG. 6 illustrates two data forwarding systems 610 and 620 coupled via communications links 630. The links may be physical links or "wireless" links. The data forwarding systems 610,620 may be routers for example. If the data forwarding systems 610,620 are example routers, each may include a control component (e.g., a routing engine) 614,624 and a forwarding component 612,622. Each data forwarding system 610,620 includes one or more interfaces 616,626 that terminate one or more communications links 630.

As just discussed above, and referring to FIG. 7, some example routers 700 include a control component (e.g., routing engine) 710 and a packet forwarding component (e.g., a packet forwarding engine) 790.

The control component 710 may include an operating system (OS) kernel 720, routing protocol process(es) 730, label-based forwarding protocol process(es) 740, interface process(es) 750, user interface (e.g., command line interface) process(es) 760, and chassis process(es) 770, and may store routing table(s) 739, label forwarding information 745, and forwarding (e.g., route-based and/or label-based) table(s) 780. As shown, the routing protocol process(es) 730 may support routing protocols such as the routing information protocol ("RIP") 731, the intermediate system-to-intermediate system protocol ("IS-IS") 732, the open shortest path first protocol ("OSPF") 733, the enhanced interior gateway routing protocol ("EIGRP") 734 and the border gateway protocol ("BGP") 735, and the label-based forwarding protocol process(es) 740 may support protocols such as BGP 735, the label distribution protocol ("LDP") 736, the resource reservation protocol ("RSVP") 737, EVPN 738 and L2VPN 739. The example methods of FIGS. 4A-4C and 5A-5C may be implemented by the BGP protocol component 735. One or more components (not shown) may permit a user 765 to interact with the user interface process(es) 760. Similarly, one or more components (not shown) may permit an outside device to interact with one or more of the router protocol process(es) 730, the label-based forwarding protocol process(es) 740, the interface process(es) 750, and the chassis process(es) 770, via SNMP 785, and such processes may send information to an outside device via SNMP 785.

The packet forwarding component 790 may include a microkernel 792 over hardware components (e.g., ASICs, switch fabric, optics, etc.) 791, interface process(es) 793, ASIC drivers 794, chassis process(es) 795 and forwarding (e.g., route-based and/or label-based) table(s) 796.

Figure 7:
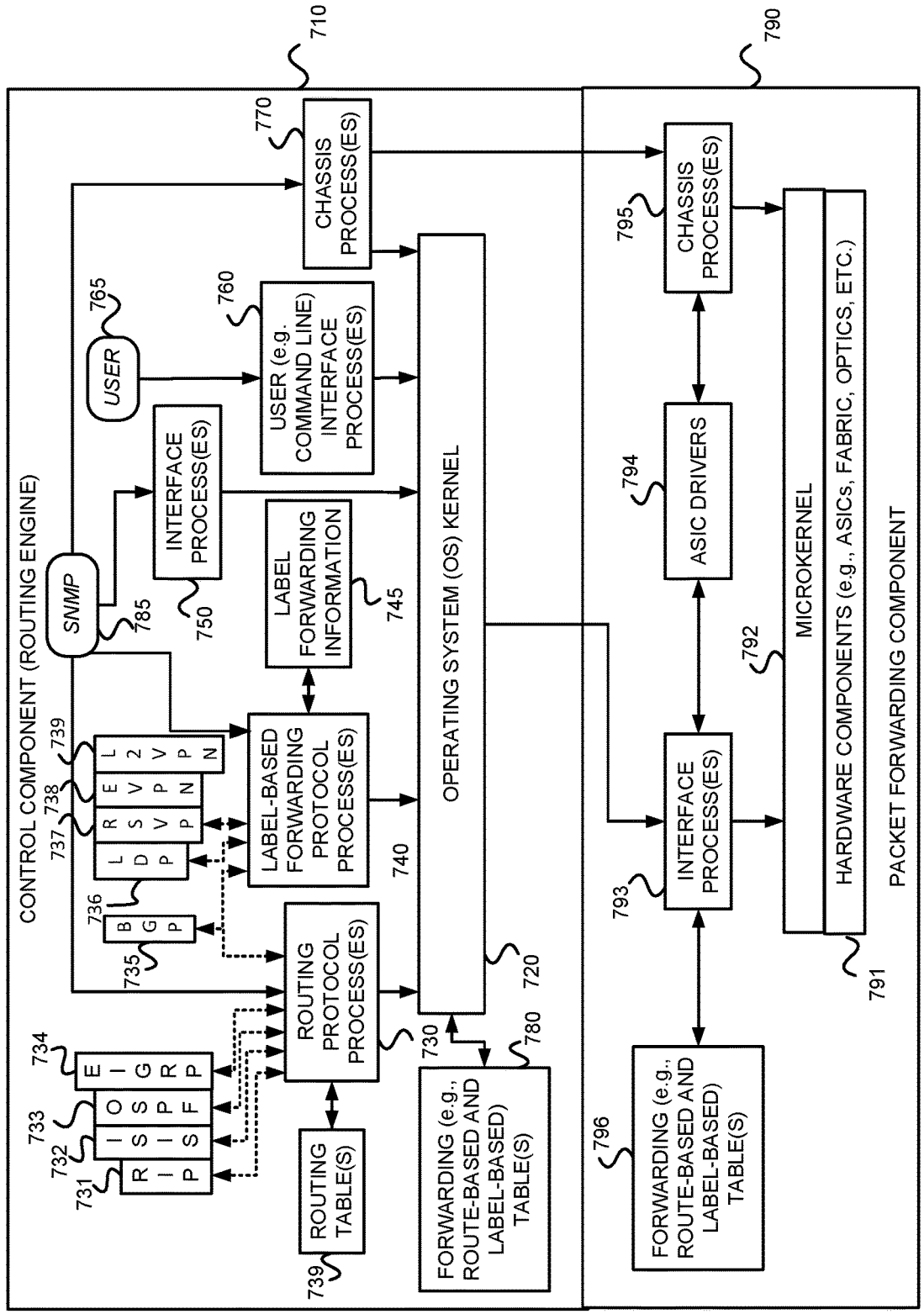
FIG. 7 is a block diagram of an example router on which the example methods of the present description may be implemented.

In the example router 700 of FIG. 7, the control component 710 handles tasks such as performing routing protocols, performing label-based forwarding protocols, control packet processing, etc., which frees the packet forwarding component 790 to forward received packets quickly. That is, received control packets (e.g., routing protocol packets and/or label-based forwarding protocol packets) are not fully processed on the packet forwarding component 790 itself, but are passed to the control component 710, thereby reducing the amount of work that the packet forwarding component 790 has to do and freeing it to process packets to be forwarded efficiently. Thus, the control component 710 is primarily responsible for running routing protocols (including, for example, methods of FIGS. 4A-4C and 5A-5C) and/or label-based forwarding protocols, maintaining the routing tables and/or label forwarding information, sending forwarding table updates to the packet forwarding component 790, and performing system management. The example control component 710 may handle routing protocol packets, provide a management interface, provide configuration management, perform accounting, and provide alarms. The processes 730, 740, 750, 760 and 770 may be modular, and may interact with the OS kernel 720. That is, nearly all of the processes communicate directly with the OS kernel 720. Using modular software that cleanly separates processes from each other isolates problems of a given process so that such problems do not impact other processes that may be running. Additionally, using modular software facilitates easier scaling.

Still referring to FIG. 7, the example OS kernel 720 may incorporate an application programming interface ("API") system for external program calls and scripting capabilities. The control component 710 may be based on an Intel PCI platform running the OS from flash memory, with an alternate copy stored on the router's hard disk. The OS kernel 720 is layered on the Intel PCI platform and establishes communication between the Intel PCI platform and processes of the control component 710. The OS kernel 720 also ensures that the forwarding tables 796 in use by the packet forwarding component 790 are in sync with those 780 in the control component 710. Thus, in addition to providing the underlying infrastructure to control component 710 software processes, the OS kernel 720 also provides a link between the control component 710 and the packet forwarding component 790.

Referring to the routing protocol process(es) 730 of FIG. 7, this process(es) 730 provides routing and routing control functions within the platform. In this example, the RIP 731, ISIS 732, OSPF 733 and EIGRP 734 (and BGP 735) protocols are provided. Naturally, other routing protocols may be provided in addition, or alternatively. Similarly, the label-based forwarding protocol process(es) 740 provides label forwarding and label control functions. In this example, the LDP 736, RSVP 737, EVPN 738 and L2VPN 739 (and BGP 735) protocols are provided. Naturally, other label-based forwarding protocols (e.g., MPLS, SR, etc.) may be provided in addition, or alternatively. In the example router 700, the routing table(s) 739 is produced by the routing protocol process(es) 730, while the label forwarding information 745 is produced by the label-based forwarding protocol process(es) 740.

Still referring to FIG. 7, the interface process(es) 750 performs configuration of the physical interfaces and encapsulation.

The example control component 710 may provide several ways to manage the router. For example, it 710 may provide a user interface process(es) 760 which allows a system operator 765 to interact with the system through configuration, modifications, and monitoring. The SNMP 785 allows SNMP-capable systems to communicate with the router platform. This also allows the platform to provide necessary SNMP information to external agents. For example, the SNMP 785 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 710, thereby avoiding slowing traffic forwarding by the packet forwarding component 790.

Although not shown, the example router 700 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 760 via a console port, an auxiliary port, and/or a management Ethernet port.

The packet forwarding component 790 is responsible for properly outputting received packets as quickly as possible. If there is no entry in the forwarding table for a given destination or a given label and the packet forwarding component 790 cannot perform forwarding by itself, it 790 may send the packets bound for that unknown destination off to the control component 710 for processing. The example packet forwarding component 790 is designed to perform Layer 2 and Layer 3 switching, route lookups, and rapid packet forwarding.

As shown in FIG. 7, the example packet forwarding component 790 has an embedded microkernel 792 over hardware components 791, interface process(es) 793, ASIC drivers 794, and chassis process(es) 795, and stores a forwarding (e.g., route-based and/or label-based) table(s) 796. The microkernel 792 interacts with the interface process(es) 793 and the chassis process(es) 795 to monitor and control these functions. The interface process(es) 792 has direct communication with the OS kernel 720 of the control component 710. This communication includes forwarding exception packets and control packets to the control component 710, receiving packets to be forwarded, receiving forwarding table updates, providing information about the health of the packet forwarding component 790 to the control component 710, and permitting configuration of the interfaces from the user interface (e.g., CLI) process(es) 760 of the control component 710. The stored forwarding table(s) 796 is static until a new one is received from the control component 710. The interface process(es) 793 uses the forwarding table(s) 796 to look up next-hop information. The interface process(es) 793 also has direct communication with the distributed ASICs. Finally, the chassis process(es) 795 may communicate directly with the microkernel 792 and with the ASIC drivers 794.

Figure 8:
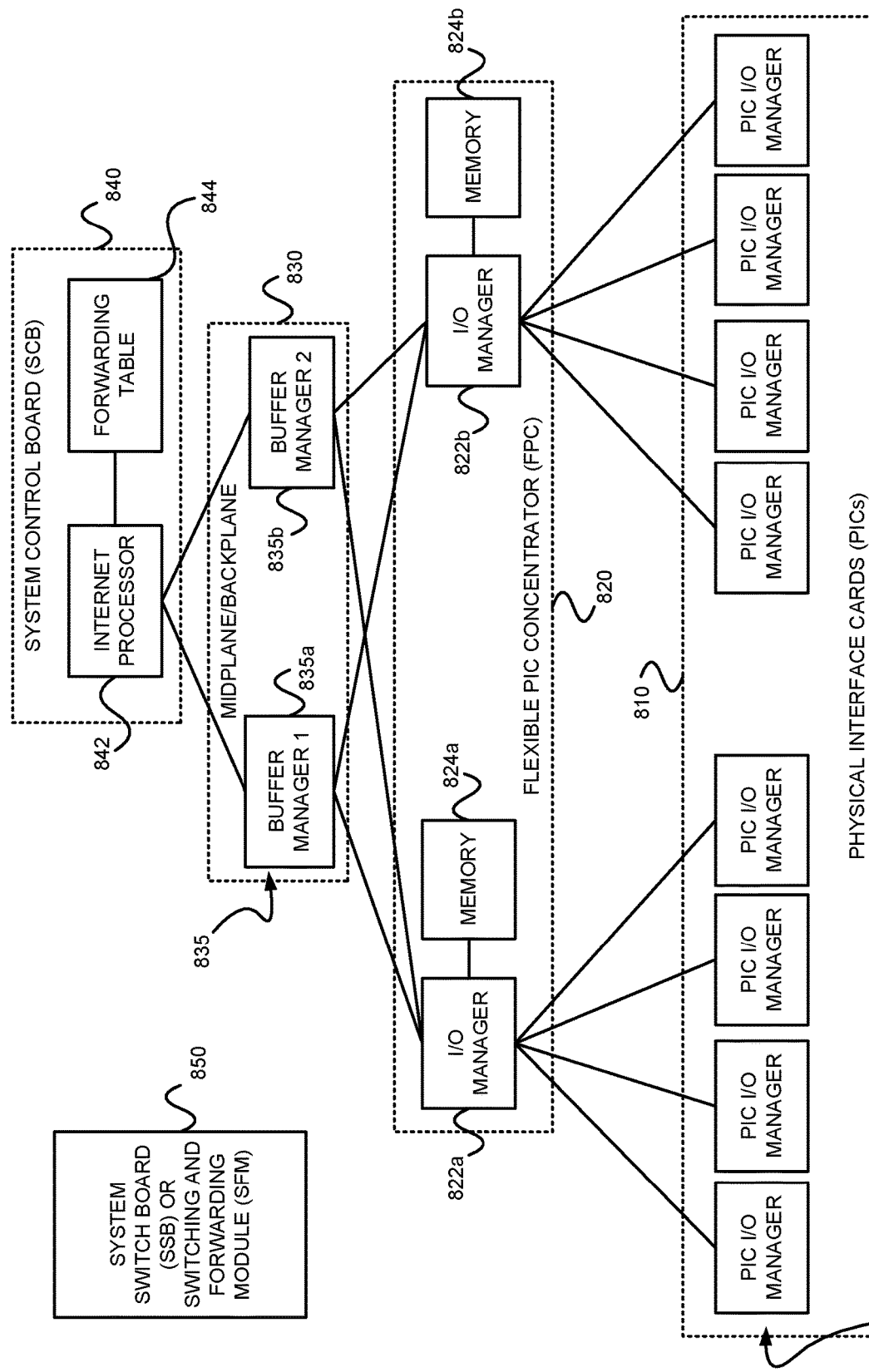
FIG. 8 is a block diagram of example distributed application specific integrated circuits ("ASICs") that may be provided in the example router of FIG. 7.
Figure 9A:
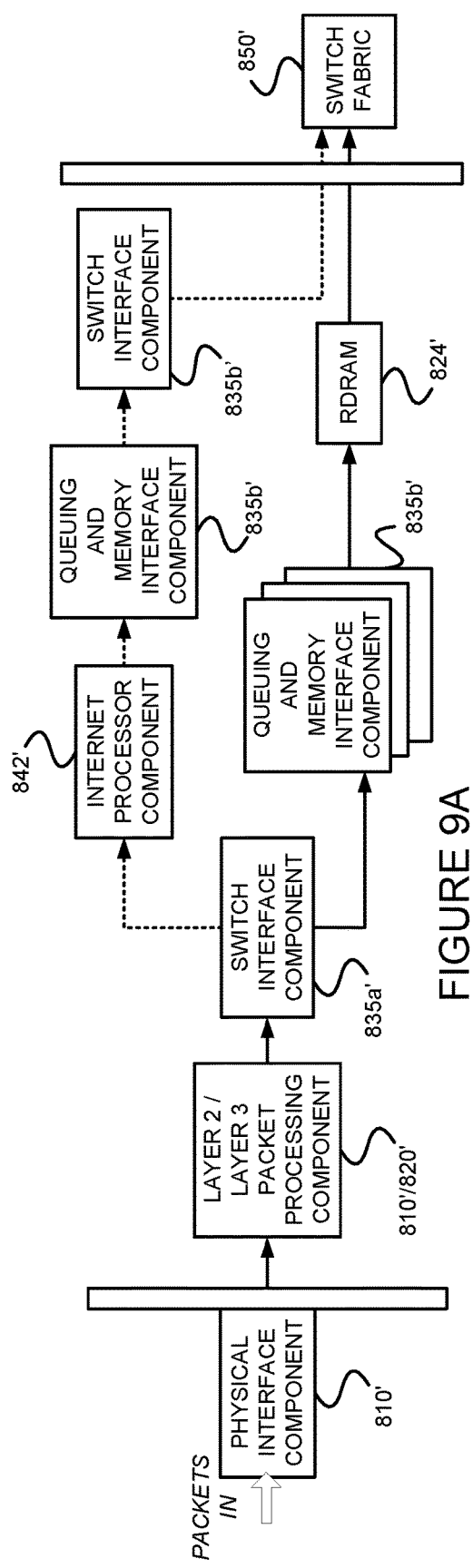
FIGS. 9A and 9B illustrate example packet forwarding operations of the example distributed ASICs of FIG. 8.
Figure 9B:
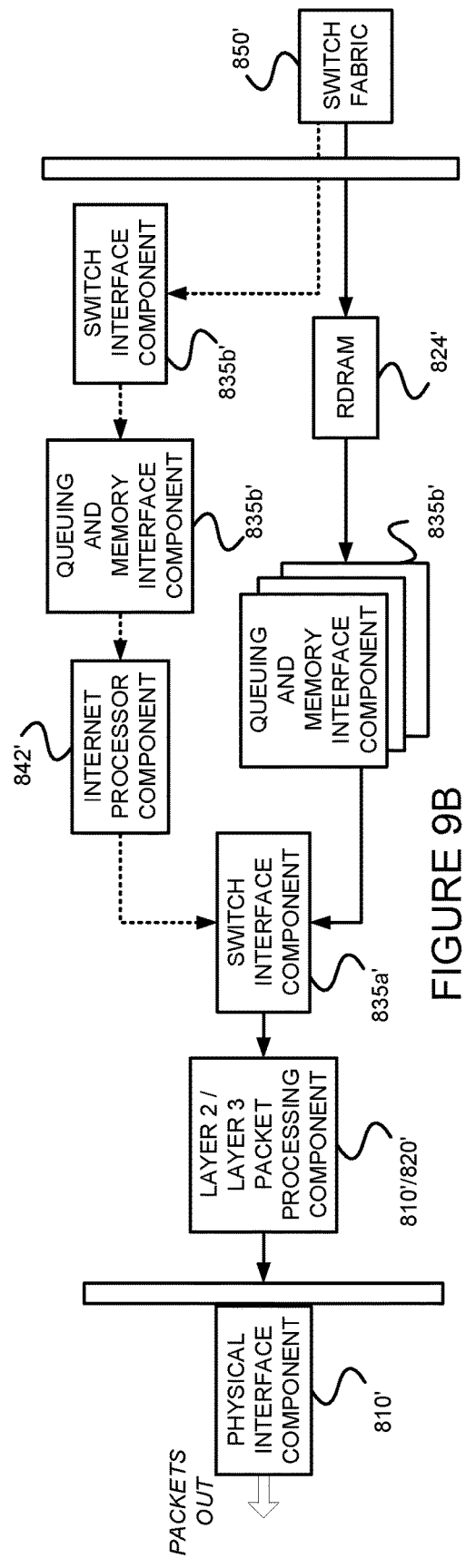

FIG. 8 is an example of how the ASICS may be distributed in the packet forwarding component 790 to divide the responsibility of packet forwarding. As shown in FIG. 8, the ASICs of the packet forwarding component 790 may be distributed on physical interface cards ("PICs") 810, flexible PIC concentrators ("FPCs") 820, a midplane or backplane 830, and a system control board(s) 840 (for switching and/or forwarding). Switching fabric is also shown as a system switch board ("SSB"), or a switching and forwarding module ("SFM") 850 (which may be a switch fabric 850' as shown in FIGS. 9A and 9B). Each of the PICs 810 includes one or more PIC I/O managers 815. Each of the FPCs 820 includes one or more I/O managers 822, each with an associated memory 824 (which may be a RDRAM 824' as shown in FIGS. 9A and 9B). The midplane/backplane 830 includes buffer managers 835a, 835b (which may be a switch interface component(s) 835a' and a queuing and memory interface component 835b' as shown in FIGS. 9A and 9B). Finally, the system control board 840 includes an internet processor 842 and an instance of the forwarding table 844 (Recall, e.g., 796 of FIG. 7).

Still referring to FIG. 8, the PICs 810 contain the interface ports. Each PIC 810 may be plugged into an FPC 820. Each individual PIC 810 may contain an ASIC that handles media-specific functions, such as framing or encapsulation. Some example PICs 810 provide SDH/SONET, ATM, Gigabit Ethernet, Fast Ethernet, and/or DS3/E3 interface ports.

An FPC 820 can contain from one or more PICs 810, and may carry the signals from the PICs 810 to the midplane/backplane 830 as shown in FIG. 8.

The midplane/backplane 830 holds the line cards. The line cards may connect into the midplane/backplane 830 when inserted into the example router's chassis from the front. The control component (e.g., routing engine) 710 may plug into the rear of the midplane/backplane 830 from the rear of the chassis. The midplane/backplane 830 may carry electrical (or optical) signals and power to each line card and to the control component 710.

The system control board 840 may perform forwarding lookup. It 840 may also communicate errors to the routing engine. Further, it 840 may also monitor the condition of the router based on information it receives from sensors. If an abnormal condition is detected, the system control board 840 may immediately notify the control component 710.

Referring to FIGS. 8, 9A and 9B, in some exemplary routers, each of the PICs 810,810' contains at least one I/O manager ASIC 815 responsible for media-specific tasks, such as encapsulation. The packets pass through these I/O ASICs on their way into and out of the router. The I/O manager ASIC 815 on the PIC 810,810' is responsible for managing the connection to the I/O manager ASIC 822 on the FPC 820,820', managing link-layer framing and creating the bit stream, performing cyclical redundancy checks (CRCs), and detecting link-layer errors and generating alarms, when appropriate. The FPC 820 includes another I/O manager ASIC 822. This ASIC 822 (shown as a layer 2/layer 3 packet processing component 810'/820') takes the packets from the PICs 810 and breaks them into (e.g., 74-byte) memory blocks. This FPC I/O manager ASIC 822 (shown as a layer 2/layer 3 packet processing component 810'/820') sends the blocks to a first distributed buffer manager (DBM) 935a (shown as switch interface component 835a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 835/835a' manages and writes packets to the shared memory 824 across all FPCs 820. In parallel, the first DBM ASIC 835/835a' also extracts information on the destination of the packet and passes this forwarding-related information to the Internet processor 842/842'. The Internet processor 842/842' performs the route lookup using the forwarding table 844 and sends the information over to a second DBM ASIC 835b'. The Internet processor ASIC 842/842' also collects exception packets (i.e., those without a forwarding table entry) and sends them to the control component 710. The second DBM ASIC 825 (shown as a queuing and memory interface component 835b') then takes this information and the 74-byte blocks and forwards them to the I/O manager ASIC 822 of the egress FPC 820/820' (or multiple egress FPCs, in the case of multicast) for reassembly. (Thus, the DBM ASICs 835a/835a' and 835b/835b' are responsible for managing the packet memory 824/824' distributed across all FPCs 820/820', extracting forwarding-related information from packets, and instructing the FPC where to forward packets.)

The I/O manager ASIC 822 on the egress FPC 820/820' may perform some value-added services. In addition to incrementing time to live ("TTL") values and re-encapsulating the packet for handling by the PIC 810, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 822 on the egress FPC 820/820' may be responsible for receiving the blocks from the second DBM ASIC 835/835', incrementing TTL values, queuing a pointer to the packet, if necessary, before applying CoS rules, re-encapsulating the blocks, and sending the encapsulated packets to the PIC I/O manager ASIC 815.

Figure 10:
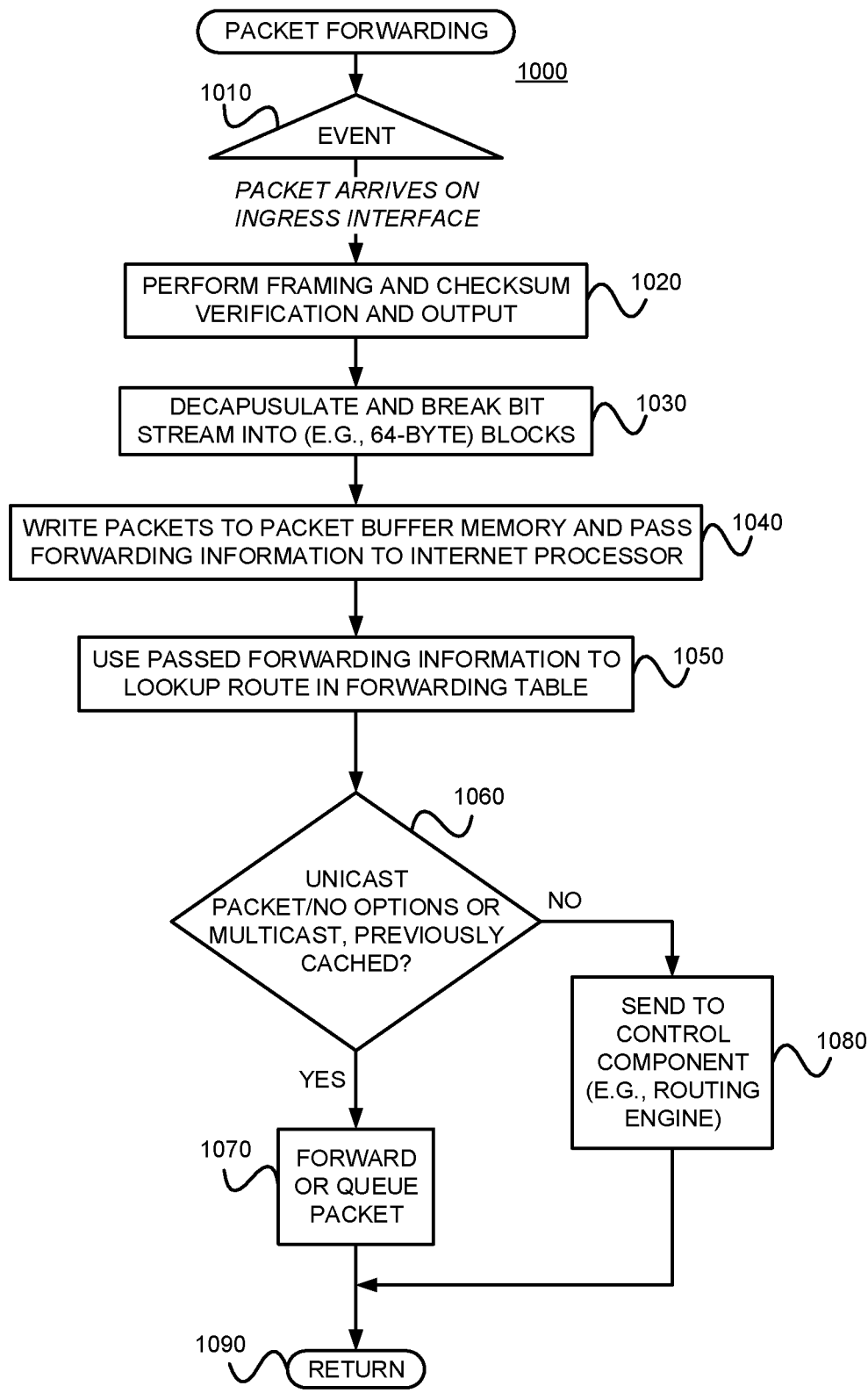
FIG. 10 is a flow diagram of an example packet forwarding method that may be implemented on any of the example routers of FIGS. 7 and 8.

FIG. 10 is a flow diagram of an example method 1000 for providing packet forwarding in the example router. The main acts of the method 1000 are triggered when a packet is received on an ingress (incoming) port or interface. (Event 1010) The types of checksum and frame checks that are required by the type of medium it serves are performed and the packet is output, as a serial bit stream. (Block 1020) The packet is then decapsulated and parsed into (e.g., 64-byte) blocks. (Block 1030) The packets are written to buffer memory and the forwarding information is passed on the Internet processor. (Block 1040) The passed forwarding information is then used to lookup a route in the forwarding table. (Block 1050) Note that the forwarding table can typically handle unicast packets that do not have options (e.g., accounting) set, and multicast packets for which it already has a cached entry. Thus, if it is determined that these conditions are met (YES branch of Decision 1060), the packet forwarding component finds the next hop and egress interface, and the packet is forwarded (or queued for forwarding) to the next hop via the egress interface (Block 1070) before the method 1000 is left (Node 1090) Otherwise, if these conditions are not met (NO branch of Decision 1060), the forwarding information is sent to the control component 710 for advanced forwarding resolution (Block 1080) before the method 1000 is left (Node 1090).

Referring back to block 1070, the packet may be queued. Actually, as stated earlier with reference to FIG. 8, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 822 may send a request for the packet to the second DBM ASIC 835*b*. The DBM ASIC 835 reads the blocks from shared memory and sends them to the I/O manager ASIC 822 on the FPC 820, which then serializes the bits and sends them to the media-specific ASIC of the egress interface. The I/O manager ASIC 815 on the egress PIC 810 may apply the physical-layer framing, perform the CRC, and send the bit stream out over the link.

Referring back to block 1080 of FIG. 10, as well as FIG. 8, regarding the transfer of control and exception packets, the system control board 840 handles nearly all exception packets. For example, the system control board 840 may pass exception packets to the control component 710.

Although example embodiments consistent with the present description may be implemented on the example routers of FIG. 6 or 7, embodiments consistent with the present description may be implemented on communications network nodes (e.g., routers, switches, etc.) having different architectures. More generally, embodiments consistent with the present description may be implemented on an example system 1100 as illustrated on FIG. 11.

Figure 11:
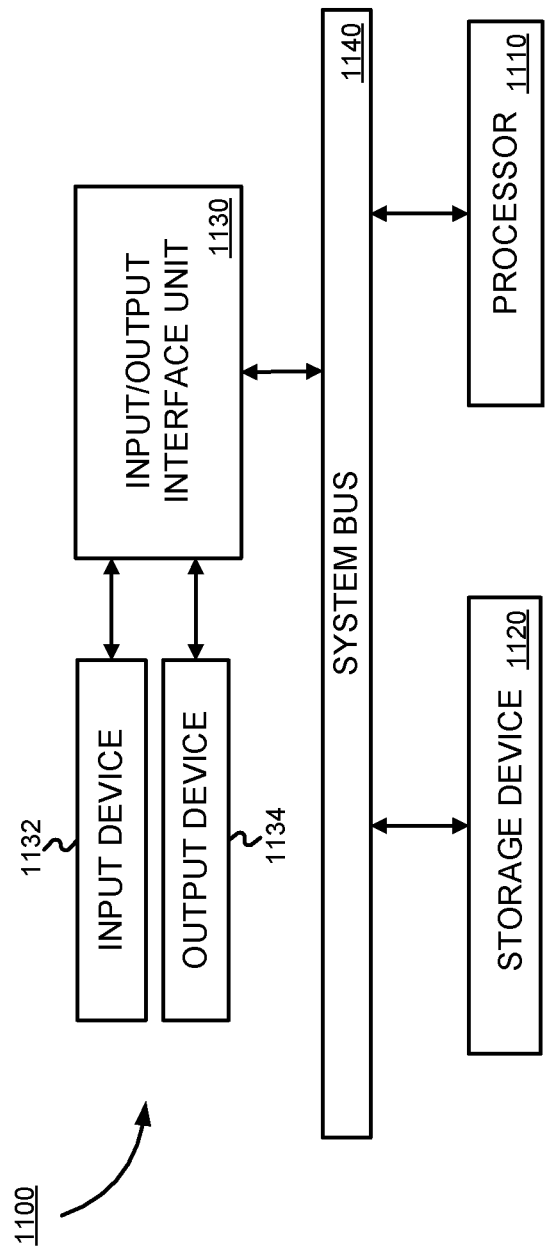
FIG. 11 is a block diagram of an example processor-based system that may be used to execute the example methods for processing

FIG. 11 is a block diagram of an exemplary machine 1100 that may perform one or more of the processes described, and/or store information used and/or generated by such processes. The exemplary machine 1100 includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130. The one or more processors 1110 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1120 and/or may be received from an external source via one or more input interface units 1130. The machine executable instructions may be stored as various software modules, each module performing one or more operations. Functional software modules are examples of components of the present description.

In some embodiments consistent with the present description, the processors 1110 may be one or more microprocessors and/or ASICs. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.3 Illustrative Operations of Example Methods

Figure 3A:
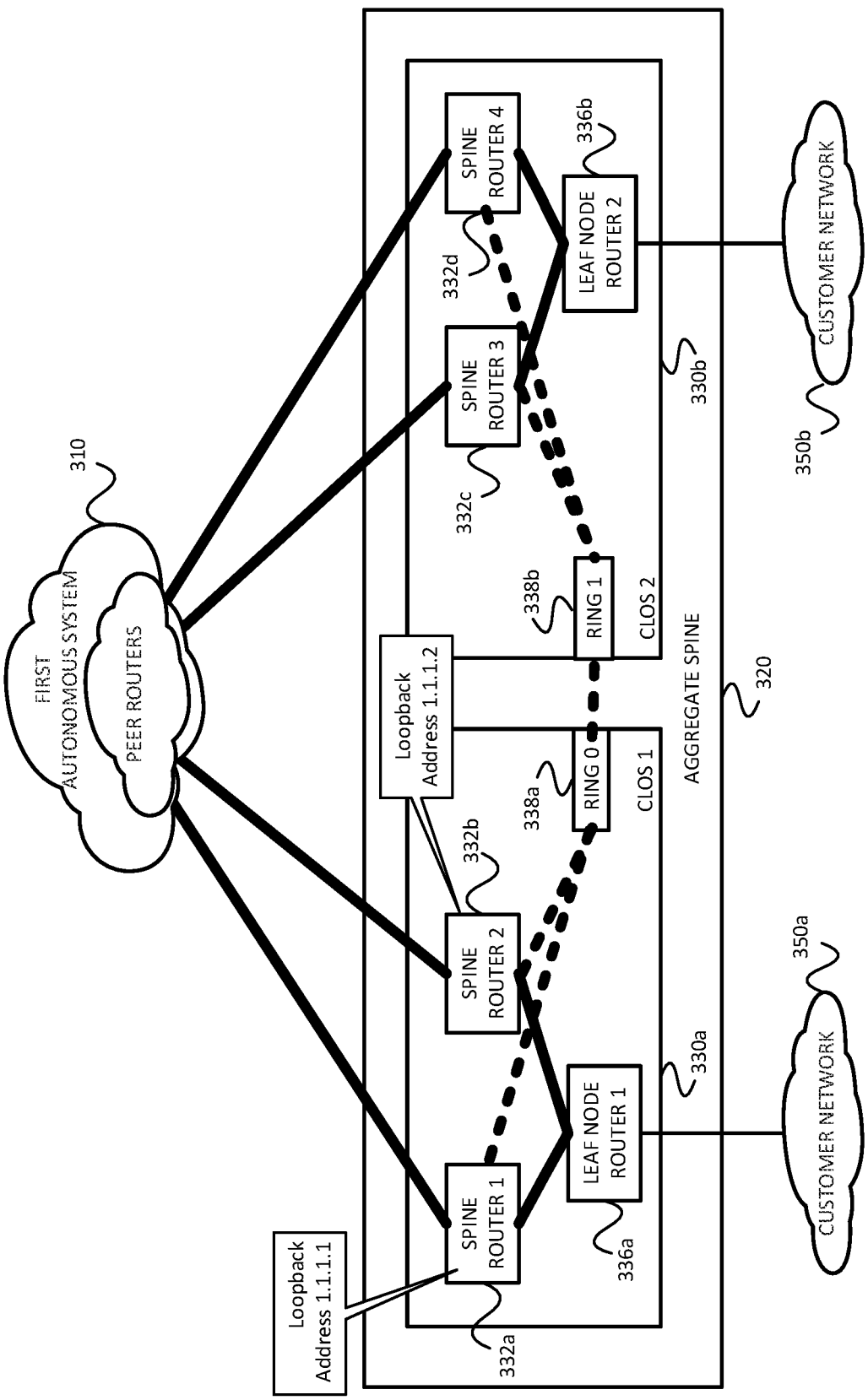
FIGS. 3A-3C illustrates disadvantages of using next hop unchanged and next hop self for eBGP learned prefixes in an example network environment.
Figure 3B:
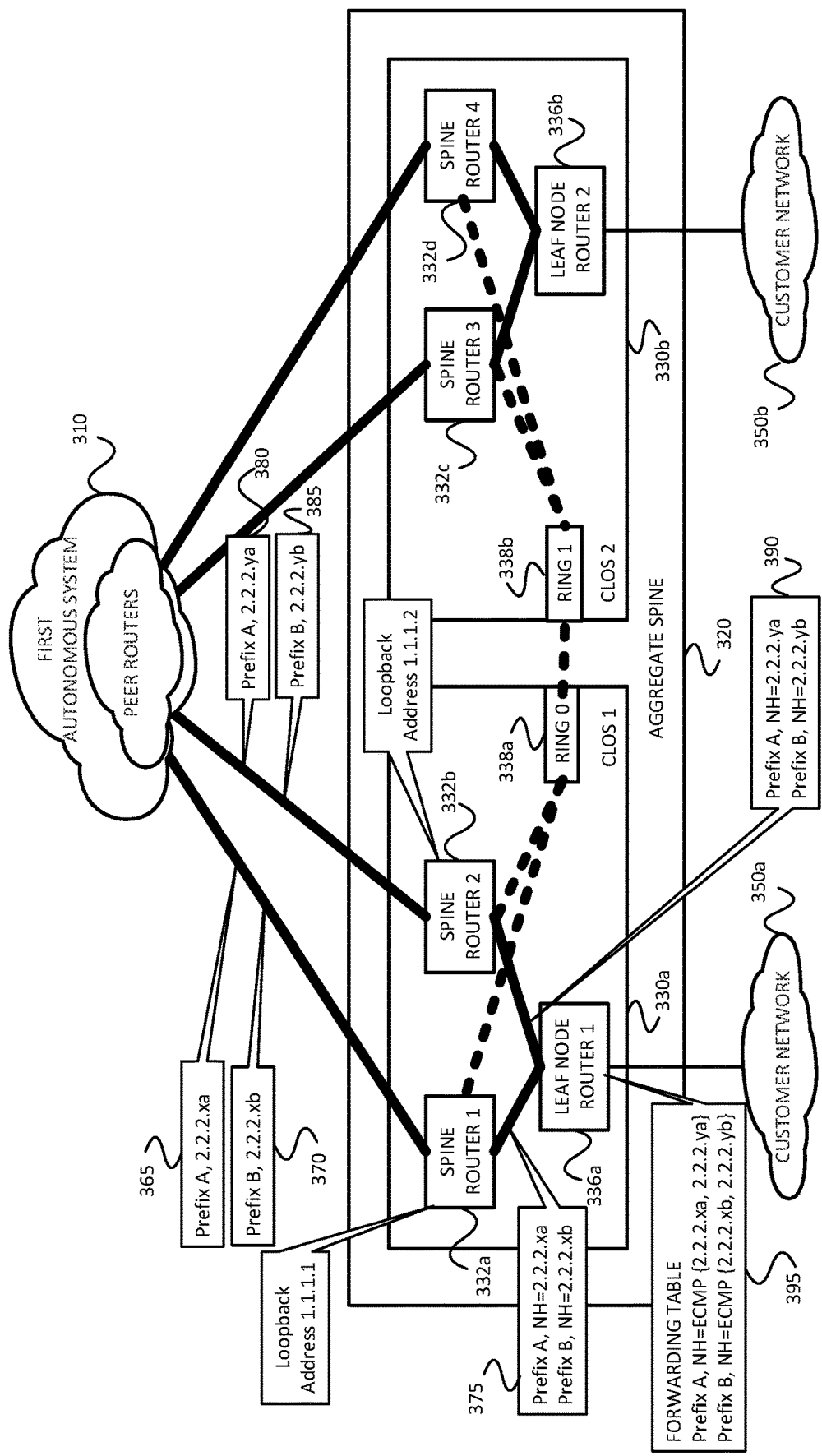
Figure 3C:
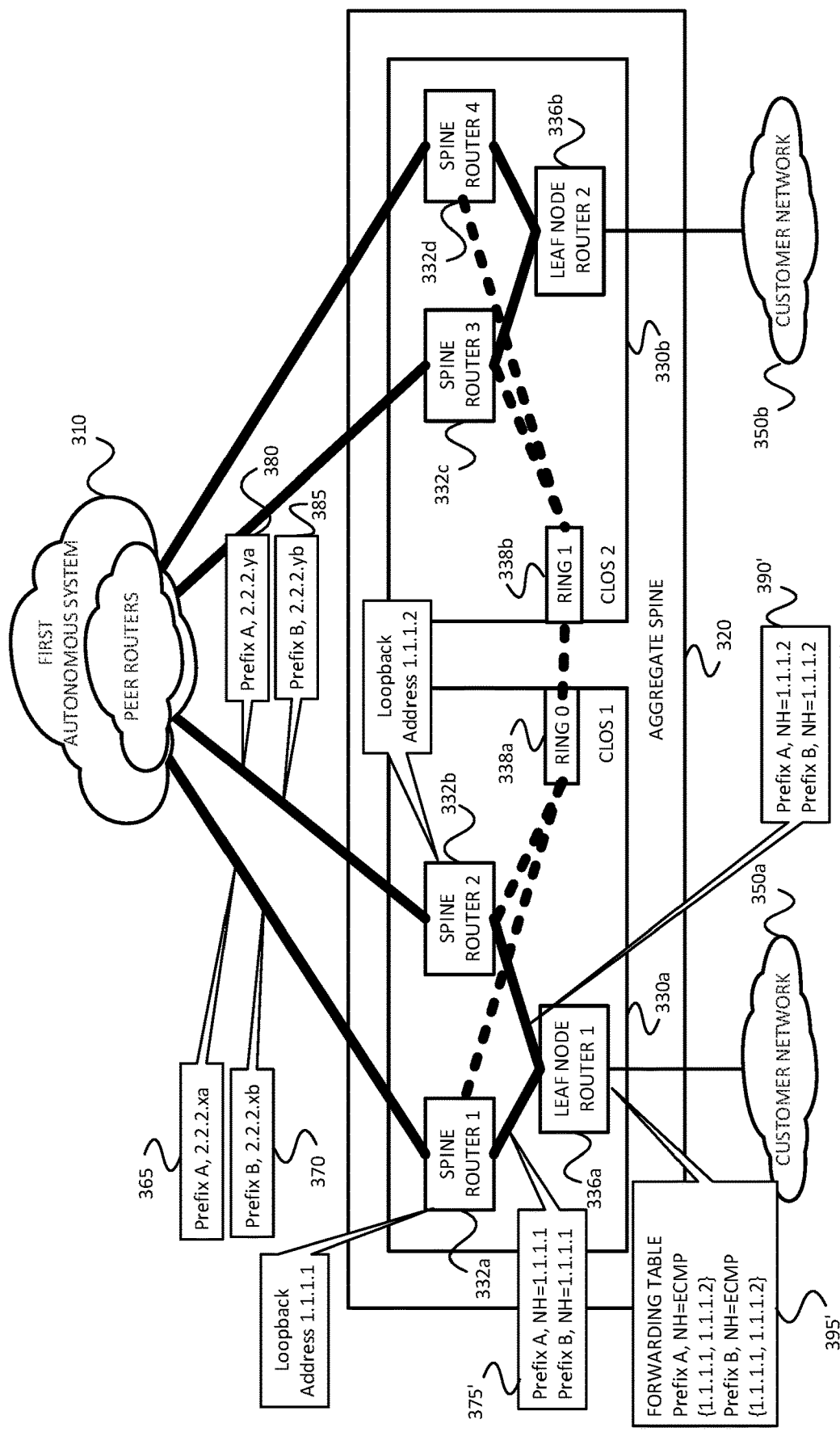
Figure 12:
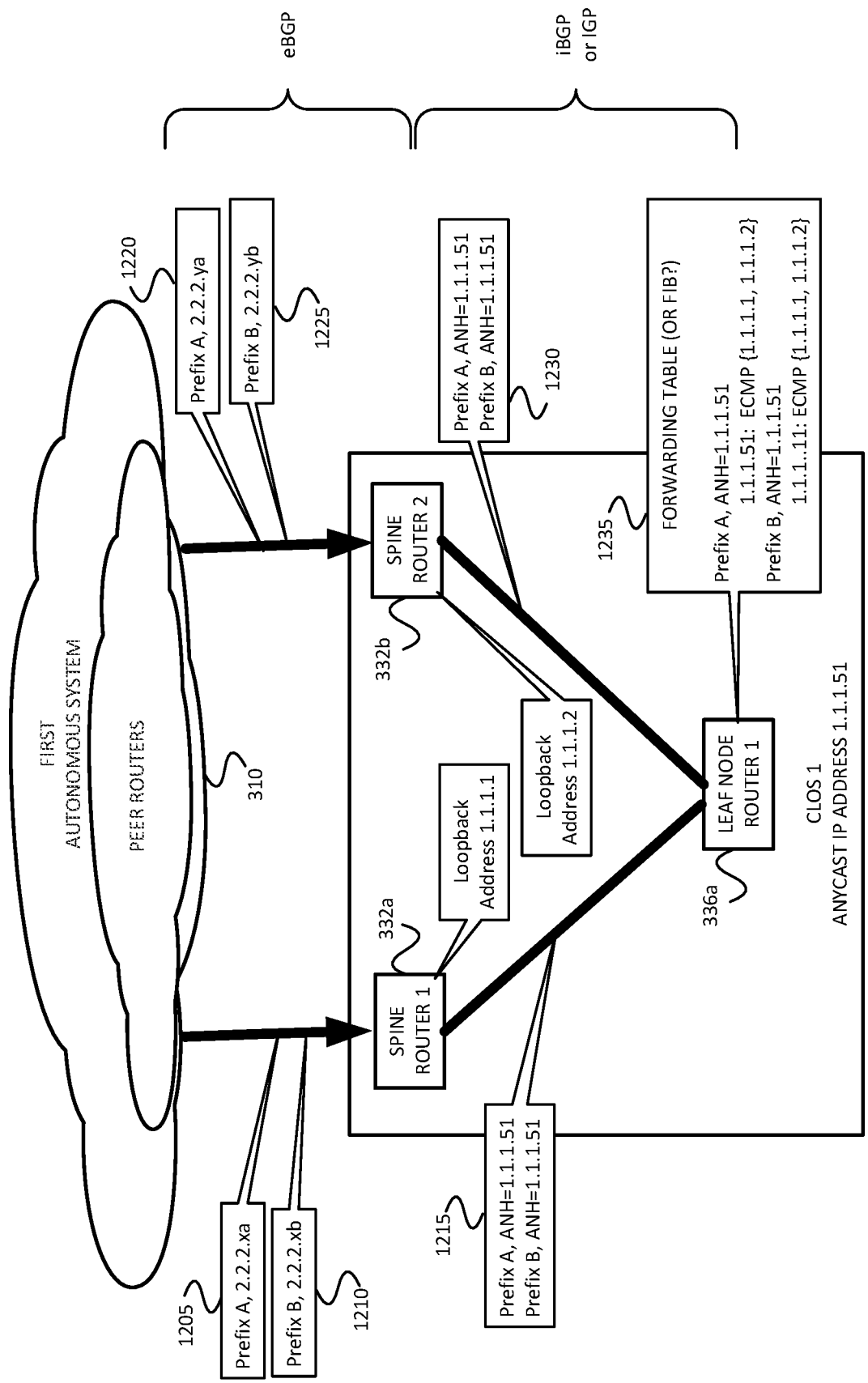
FIG. 12 illustrates an example of operations of an example method consistent with the present description in the example network of FIG. 3A.

FIG. 12 illustrates an example of operations of an example method(s) consistent with the present description in a part of the example network 300 of FIG. 3A. Each ASBR (shown as spine routers) advertises all received routes with the anycast IP address (1.1.1.51) associated with the Clos 330*a* to which spine router 1, spine router 2, leaf node router 1 and ring router 0 (not shown) belong. Spine router 1 receives a next hop for each of prefixes A and B from an eBGP peer(s) in AS 310. This information 1205,1210 may be included in one or more BGP update messages. (Recall, e.g., 190 of FIG. 1A.) Similarly, spine router 2 receives the same or different next hop for each of prefixes A and B from the same or different eBGP peer(s) in AS 310. This information 1205,1210 may be included in one or more BGP update messages. As shown by 1215, spine router 1 replaces the received next hops with the anycast address (1.1.1.51) of Clos 1, and this information 1215 is communicated, via iBGP or an IGP, to leaf node router 1 336a. (Recall, e.g., blocks 410, 415, 470, 510 and 515.) Similarly, as shown by 1220,1225 spine router 2 replaces the received next hops with the anycast address (1.1.1.51) of Clos 1, and this information 1230 is communicated, via iBGP or an IGP, to leaf node router 1 336a. The leaf node router 1 can process and store this information in a forwarding table 1235 as (1) an entry for prefix A in which the next hop is the any cast address (1.1.1.51), which is associated with an equal cost multipath (ECMP) including both the IP address of spine router 1 (1.1.1.1) and the IP address of spine router 2 (1.1.1.2), and (2) an entry for prefix B in which the next hop is also the any cast address (1.1.1.51), which is associated with an equal cost multipath (ECMP) including both the IP address of spine router 1 (1.1.1.1) and the IP address of spine router 2 (1.1.1.2). (Recall, e.g., 440, 445, 450, 540 and 545.) These next hops can forward a packet destined for prefix A or prefix B to either spine router 1 or spine router 2, which have sufficient forwarding information to forward such a packet on to the appropriate BGP peer router in AS 310. As can be appreciated from this example, when compared with "next hop unchanged" and "next hop self," example methods consistent with the present description reduce the number of next hops (e.g., to one per Clos).

Figure 13:
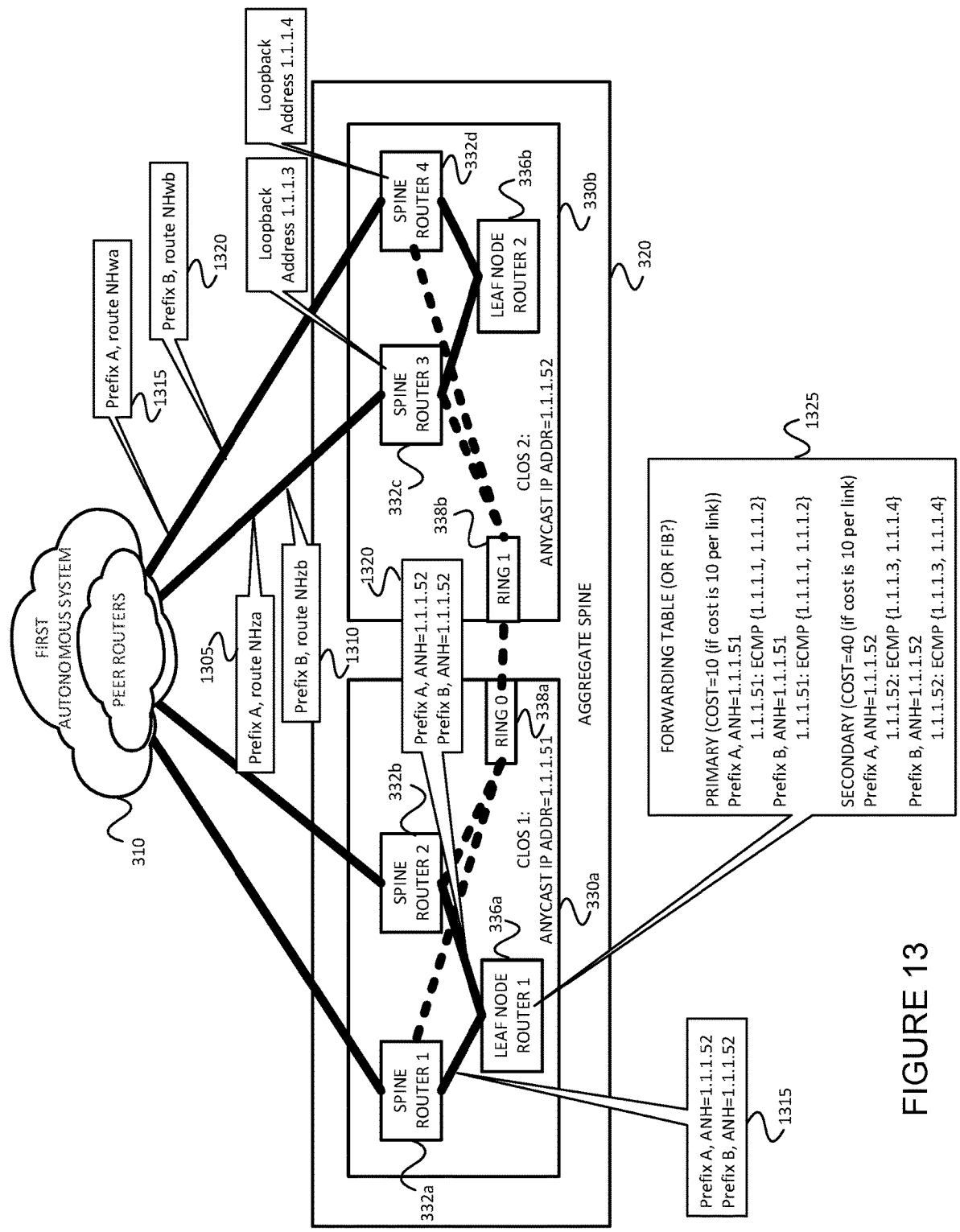
FIG. 13 illustrates an example of operations of an example method consistent with the present description in the example network of FIG. 3A.

FIG. 13 illustrates an example of operations of an example method(s) consistent with the present description in the example network 300 of FIG. 3A. In this example, assume that the communication of reachability and/or link state information described with reference to FIG. 12 has already occurred. In addition, each ASBR in Clos 2 330b advertise all received routes with the anycast IP address (1.1.1.52) associated with Clos 2 330b, to which spine router 3, spine router 4, leaf node router 2 and ring router 1 belong. As shown, spine router 3 receives a next hop for each of prefixes A and B from an eBGP peer(s) in AS 310. This information 1305,1310 may be included in one or more BGP update messages. (Recall, e.g., 190 of FIG. 1A.) Similarly, spine router 4 receives the same or different next hop for each of prefixes A and B from the same or different eBGP peer(s) in AS 310. This information 1315,1320 may be included in one or more BGP update messages. As shown, each of spine routers 3 and 4 replaces the received next hops with the anycast address (1.1.1.52) of Clos 2, and this information 1315,1320 is communicated, via iBGP or an IGP, to leaf node router 1 336a. (Recall 580.)

Assume that each of the links has a cost of 10, and further assume that the leaf node router 1 336a uses open shortest path first (OSPF) to determine routes. As a result, the leaf node router 1 can process and store this information in a forwarding table 1325 as (1) a "primary" entry for prefix A in which the next hop is the any cast address (1.1.1.51), which is associated with an equal cost multipath (ECMP) including both the IP address of spine router 1 (1.1.1.1) and the IP address of spine router 2 (1.1.1.2), (2) a "secondary" or "backup" entry for prefix A in which the next hop is the any cast address (1.1.1.52) of Clos 2, which is associated with an equal cost multipath (ECMP) including both the IP address of spine router 3 (1.1.1.3) and the IP address of spine router 4 (1.1.1.4), (3) a "primary" entry for prefix B in which the next hop is also the any cast address of Clos 1 (1.1.1.51), which is associated with an equal cost multipath (ECMP) including both the IP address of spine router 1 (1.1.1.1) and the IP address of spine router 2 (1.1.1.2), and (4) a "secondary" or "backup" entry for prefix B in which the next hop is also the any cast address of Clos 2 (1.1.1.52), which is associated with an equal cost multipath (ECMP) including both the IP address of spine router 3 (1.1.1.3) and the IP address of spine router 4 (1.1.1.4).

Note that the primary routes have a cost of 10 (one hop (1) from leaf node router 1 to either spine router 1 or spine router 2), while the secondary routes have a cost of 40 (four hops, (1) from leaf node router 1 to either spine router 1 or spine router 2, (2) from spine router 1 or spine router 2 to ring router 0, (3) from ring router 0 to ring router 1, and (4) from ring router 1 to either spine router 3 or spine router 4. The difference in costs is used to select the primary and secondary routes for each prefix. (Recall 540, 545 and 560.)

Figure 14:
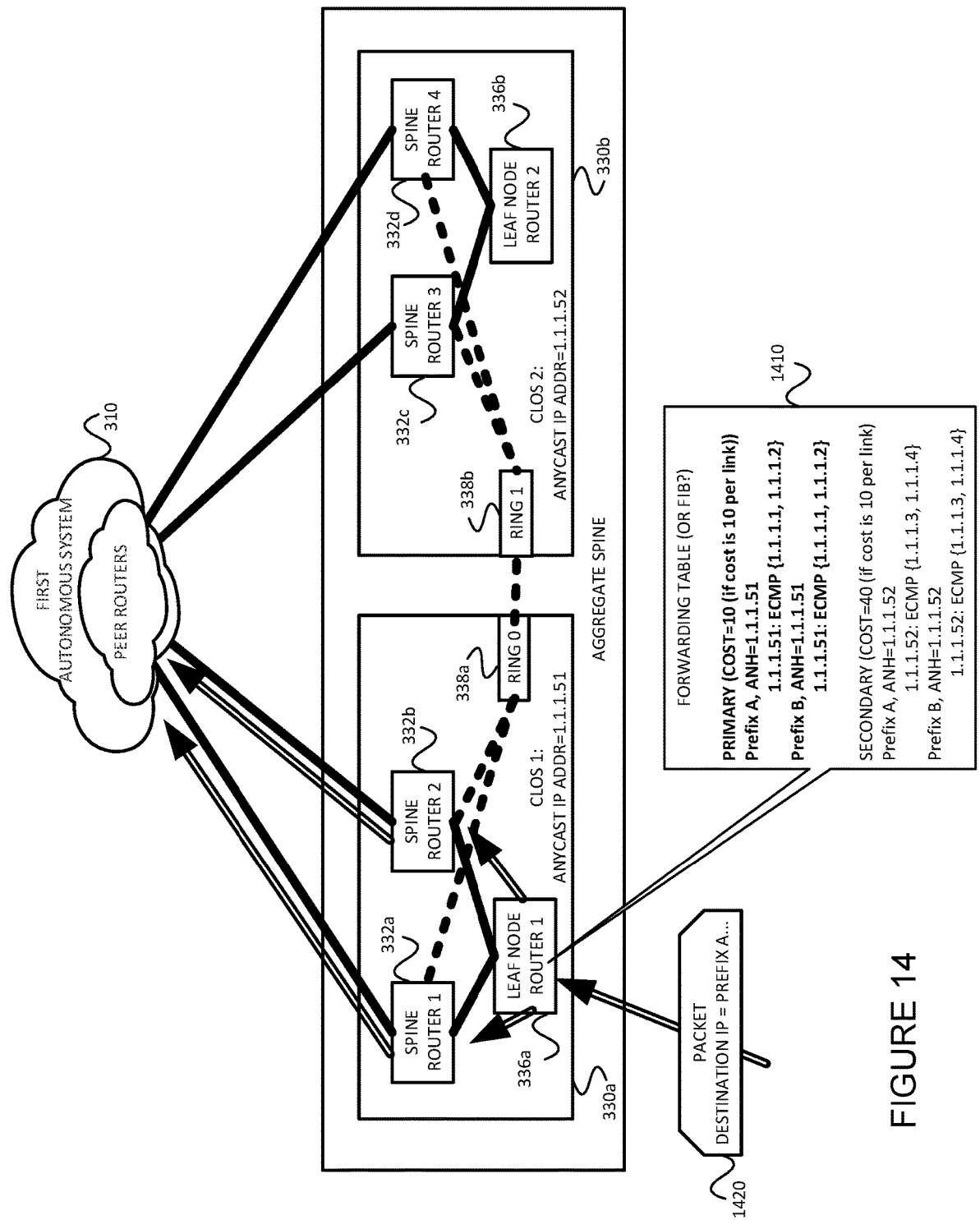
FIG. 14 illustrates an example of operations of an example method consistent with the present description in the example network of FIG. 3A.
Figure 15:
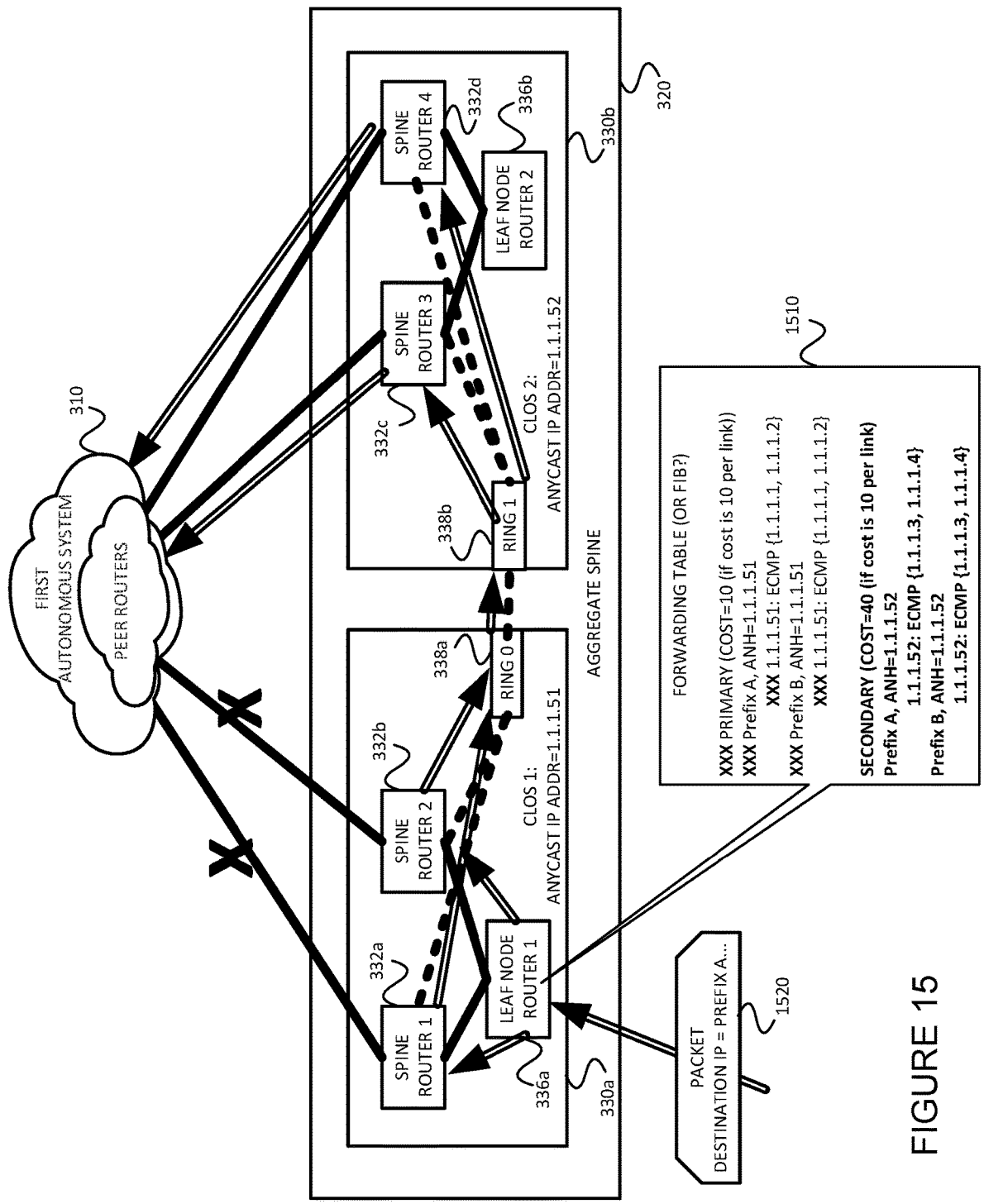
FIG. 15 illustrates an example of operations of an example method consistent with the present description in the example network of FIG. 3A.

Referring to FIG. 14, assume a packet 1420 destined for prefix A is received by the leaf node router 1. The packet 1420 can be forwarded to either spine router 1 or spine router 2, which have sufficient forwarding information to forward such a packet on to the appropriate BGP peer router in AS 310. The forwarding is indicated by double lined arrows. If one of (A) the link between spine router 1 and the external AS, or (B) the link between spine router 2 and the external AS fails, the other link can be used. However, if both links fail, then the secondary route information can be used, as shown in FIG. 15. More specifically, as shown in FIG. 15, if both links between Clos 1 and the external AS 310 fail, the leaf node router 1 will use the secondary or backup routes as highlighted in the forwarding table 1510. The packet 1520 can be forwarded to either spine router 3 or spine router 4, which have sufficient forwarding information to forward such a packet on to the appropriate BGP peer router in AS 310. The forwarding is indicated by double lined arrows.

As can be appreciated from the foregoing examples, when compared with "next hop unchanged" and "next hop self," example methods consistent with the present description reduce the number of next hops (e.g., to one per Clos).

§ 4.4 Refinements, Alternatives and Extensions

Although many of the foregoing examples were described in the context of an aggregate spine having more than one Clos, example embodiments consistent with the present description may be used in the context of other ASBR and non-ASBR routers sharing an anycast address and belonging to the same IGP domain. Indeed, example embodiments consistent with the present description may be used in the context of multiple sets of other ASBR and non-ASBR routers sharing a anycast address (e.g., such as multiple Closes), the multiple sets of routers belonging to the same IGP domain.

§ 4.5 Conclusions

By enhancing the ANH capability to use anycast IP address(es), eBGP NH path state and/or communications can be reduced. With the use of BGP-PIC (N+1), in which primary paths use the same outgoing links and secondary paths use the same outgoing links, BGP path convergence time can be reduced, and/or overall traffic losses may be reduced. In Clos scale out router architectures and disaggregated networking implementations, example embodiments consistent with the present description will provide especially significant advantages.

What is claimed is:

1. A computer-implemented method for use in a system including a first autonomous system border router (ASBR) and another router, both provided in a first domain in which routers share a first anycast address, the computer-implemented method comprising:
   a) receiving by the first ASBR, from an exterior Border Gateway Protocol (eBGP) peer, first reachability information for a first prefix, the first reachability information including a first next hop (NH) address;
   b) communicating by the first ASBR, first link state information about the first prefix to the other router, the first link state information associating the first prefix with the first anycast address;
   c) receiving by the first ASBR, from an eBGP peer, second reachability information for a second prefix, the second reachability information including a second next hop (NH) address;
   d) communicating by the first ASBR, second link state information about the second prefix to the other router, the second link state information associating the second prefix with the first anycast address;
   e) receiving by the other router, the first reachability information for the first prefix and the second reachability information for the second prefix; and
   f) storing by the other router, forwarding information, the forwarding information including
      (1) the first prefix associated with the first anycast address, the first anycast address provided as a next hop for the first prefix, and
      (2) the second prefix associated with the first anycast address, the first anycast address provided as a next hop for the second prefix.

2. The computer-implemented method of claim 1, wherein the system further includes a second ASBR provided in the first domain, the computer-implemented method further comprising:
   g) receiving by the second ASBR, from an exterior Border Gateway Protocol (eBGP) peer, third reachability information for the first prefix, the third reachability information including a second next hop (NH) address;
   h) communicating by the second ASBR, third link state information about the first prefix to the other router, the third link state information associating the first prefix with the first anycast address;
   i) receiving by the other router, the third reachability information for the first prefix; and
   j) storing by the other router, forwarding information, the forwarding information including
      (1) the first prefix associated with the first anycast address, the first anycast address provided as a next hop for the first prefix,
      (2) an association of the first anycast address with both the first ASBR and the second ASBR, and
      (3) the second prefix associated with the first anycast address, the first anycast address provided as a next hop for the second prefix.

3. The computer-implemented method of claim 2, wherein the first ASBR and the second ASBR are associated with the first anycast address as equal cost multipaths (ECMPs).

4. The computer-implemented method of claim 1, wherein the system further includes a second ASBR provided in a second domain in which routers share a second anycast address, the second domain being separate from the first domain but belonging to an interior gateway protocol (IGP) domain to which the first domain also belongs, the computer-implemented method further comprising:
   g) receiving by the second ASBR, from an exterior Border Gateway Protocol (eBGP) peer, third reachability information for the first prefix, the third reachability information including a second next hop (NH) address;
   h) communicating by the second ASBR, third link state information about the first prefix to the other router, the third link state information associating the first prefix with the second anycast address associated with the second domain;
   i) receiving by the other router, the third reachability information for the first prefix; and
   j) storing by the other router, forwarding information, the forwarding information including
      (1) the first prefix associated with the first anycast address, the first anycast address provided as a next hop for the first prefix in a primary route,
      (2) the first prefix associated with the second anycast address, the second anycast address provided as a next hop for the first prefix in a secondary route, and
      (3) the second prefix associated with the first anycast address, the first anycast address provided as a next hop for the second prefix.

5. The computer-implemented method of claim 1, wherein the first anycast address is an abstract next hop.

6. The computer-implemented method of claim 1, wherein the domain has a Clos network topology, the first ASBR is a spine node, and the other router is a leaf node.

7. The computer-implemented method of claim 1, wherein the eBGP peer from which the first reachability information for the first prefix was received is the same as the eBGP peer from which the second reachability information for the second prefix was received.

8. The computer-implemented method of claim 1, wherein the eBGP peer from which the first reachability information for the first prefix was received is different from the eBGP peer from which the second reachability information for the second prefix was received.

9. A computer-implemented method for use in an autonomous system border router (ASBR) being provided in a domain in which routers share an anycast address, the computer-implemented method comprising:
   a) receiving, from an exterior Border Gateway Protocol (eBGP) peer, first reachability information for a first prefix, the first reachability information including a first next hop (NH) address;
   b) communicating first link state information about the first prefix to another router in the domain, the first link state information associating the first prefix with the anycast address;
   c) receiving, from an eBGP peer, second reachability information for a second prefix, the second reachability information including a second next hop (NH) address; and
   d) communicating second link state information about the second prefix to the other router in the domain, the second link state information associating the second prefix with the anycast address.

10. The computer-implemented method of claim 9, wherein the anycast address is a next hop.

11. The computer-implemented method of claim 9, wherein the anycast address is an abstract next hop.

12. The computer-implemented method of claim 9, wherein the domain has a Clos network topology, the ASBR is a spine node, and the other router is a leaf node.

13. The computer-implemented method of claim 9, wherein the eBGP peer from which the first reachability information for the first prefix was received is the same as the eBGP peer from which the second reachability information for the second prefix was received.

14. The computer-implemented method of claim 9, wherein the eBGP peer from which the first reachability information for the first prefix was received is different from the eBGP peer from which the second reachability information for the second prefix was received.

15. An autonomous system border router (ASBR) being provided in a domain in which routers share an anycast address, the ASBR comprising:
  a) at least one processor; and
  b) at least one storage device storing processor executable instructions which, when executed by the at least one processor, cause the at least one processor to perform a method including
    1) receiving, from an exterior Border Gateway Protocol (eBGP) peer, first reachability information for a first prefix, the first reachability information including a first next hop (NH) address,
    2) communicating first link state information about the first prefix to another router in the domain, the first link state information associating the first prefix with the anycast address,
    3) receiving, from an eBGP peer, second reachability information for a second prefix, the second reachability information including a second next hop (NH) address, and
    4) communicating second link state information about the second prefix to the other router in the domain, the second link state information associating the second prefix with the anycast address.

16. The ASBR of claim 15, wherein the anycast address is an abstract next hop.

17. The ASBR of claim 15, wherein the domain has a Clos network topology, the ASBR is a spine node, and the other router is a leaf node.

18. The ASBR of claim 15, wherein the eBGP peer from which the first reachability information for the first prefix was received is the same as the eBGP peer from which the second reachability information for the second prefix was received.

19. The ASBR of claim 15, wherein the eBGP peer from which the first reachability information for the first prefix was received is different from the eBGP peer from which the second reachability information for the second prefix was received.

20. The ASBR of claim 15, wherein the eBGP peer from which the first reachability information for the first prefix was received is different from the eBGP peer from which the second reachability information for the second prefix was received, but belongs to the same autonomous system.

* * * * *